United States Patent
Matsubayashi

(10) Patent No.: US 8,290,349 B2
(45) Date of Patent: Oct. 16, 2012

(54) PLAYBACK APPARATUS, METHOD, AND PROGRAM

(75) Inventor: Kei Matsubayashi, Kanagawa (JP)

(73) Assignee: Sony Corporation (JP)

( * ) Notice: Subject to any disclaimer, the term of this patent is extended or adjusted under 35 U.S.C. 154(b) by 846 days.

(21) Appl. No.: 11/990,901

(22) PCT Filed: Jun. 22, 2007

(86) PCT No.: PCT/JP2007/062568
§ 371 (c)(1),
(2), (4) Date: Apr. 23, 2009

(87) PCT Pub. No.: WO2007/148777
PCT Pub. Date: Dec. 27, 2007

(65) Prior Publication Data
US 2009/0317064 A1 Dec. 24, 2009

(30) Foreign Application Priority Data
Jun. 22, 2006 (JP) .................. 2006-172751

(51) Int. Cl.
H04N 5/783 (2006.01)
H04N 5/765 (2006.01)
H04N 5/917 (2006.01)
H04N 7/16 (2011.01)
H04N 7/173 (2011.01)
H04N 9/80 (2006.01)
G06F 5/00 (2006.01)
G06F 9/34 (2006.01)
G06F 13/00 (2006.01)
G06F 19/00 (2011.01)
G11B 11/00 (2006.01)
G11B 13/00 (2006.01)

(52) U.S. Cl. ........ 386/343; 386/200; 386/241; 386/331; 386/351; 369/14; 369/15; 700/93; 710/40; 711/137; 711/158; 711/204; 725/50; 725/86; 725/88; 725/90; 725/96; 725/98; 725/102; 725/115; 725/145

(58) Field of Classification Search .................. 386/343, 386/200, 241, 331, 351, E5.001; 348/E5.008, 348/E7.061, E7.071; 369/14, 15; 375/E7.09, 375/E7.211; 700/93; 710/40; 711/137, 711/158, 204; 725/50, 88, 86, 90, 96, 98, 725/102, 115, 145; G9B/27.019
See application file for complete search history.

(56) References Cited

U.S. PATENT DOCUMENTS 6,128,712 A * 10/2000 Hunt et al. ..................... 711/158
(Continued)

FOREIGN PATENT DOCUMENTS

JP         10-322681 A      12/1998
(Continued)

OTHER PUBLICATIONS

Lee S-J et al: "An interactive video delivery and caching system using video summarization" Computer Communications, Elsevier Science Publishers BV, Amsterdam, NL LNKD—DOI:10.1016/S0140-3664(01)00414-5, vol. 25, No. 4, Mar. 1, 2002, pp. 424-435, XP004327040ISSN: 0140-3664.*
(Continued)

*Primary Examiner* — Thai Tran
*Assistant Examiner* — Syed Hasan
(74) *Attorney, Agent, or Firm* — Lerner, David, Littenberg, Krumholz & Mentli, LLP

(57) ABSTRACT

The present invention relates to a playback apparatus, a method, and a program which can appropriately perform jump playback when content transmitted through a network is played back in real time. A terminal 3 receives stream data transmitted from a server 1, buffers the stream data, and plays back the buffered data. The terminal 3 has multiple buffers to allow content data of the positions of jump destinations that can be specified as a jump destination during jump playback to be pre-buffered in the multiple buffers. As a result, upon receiving a request for jump playback, the terminal 3 can start playback from a jump destination without delay, since the data of the jump destination has already been buffered. The present invention is applied to, for example, television receivers.

11 Claims, 25 Drawing Sheets

U.S. PATENT DOCUMENTS

| | | | |
|---|---|---|---|
| 6,993,786 B1* | 1/2006 | Maruya et al. | 725/88 |
| 2001/0013128 A1* | 8/2001 | Hagai et al. | 725/90 |
| 2004/0170379 A1 | 9/2004 | Yao et al. | |
| 2005/0210145 A1 | 9/2005 | Kim et al. | |

FOREIGN PATENT DOCUMENTS

| | | |
|---|---|---|
| JP | 2000-013755 A | 1/2000 |
| JP | 2000-013777 A | 1/2000 |
| JP | 2003-209823 A | 7/2003 |
| JP | 2004-274695 A | 9/2004 |

OTHER PUBLICATIONS

Communication from EP Application No. 07767383.8-2223, dated Apr. 13, 2011.

Supplementary European Search Report, EP 97767383, dated Jul. 14, 2010.

Lee S-J et al: "An interactive video delivery and caching system using video summarization" Computer Communications, Elsevier Science Publishers BV, Amsterdam, NL LNKD—001:10.1 016/S0140-3664 (01 )00414-5, vol. 25, No. 4, Mar. 1, 2002, pp. 424-435, XP004327040.

Zongming Fei et al: "Providing interactive functions for staggered multicast near video-an-demand systems" Multimedia Computing and Systems, 1999. IEEE International Conference on Florence, Italy Jun. 7-11, 1999, Los Alamitos, CA, USA,IEEE Comput. Soc, US LNKDDOI: 10.1109/MMCS.1999.778617, vol. 2, Jun. 7, 1999, pp. 949-953, XP010519520.

* cited by examiner

FIG. 8

| IDENTIFICATION INFORMATION OF NORMAL BUFFERING DATA | NO. OF BUFFER | AMOUNT OF STORED DATA |
|---|---|---|
| IDENTIFICATION INFORMATION OF FRONT END OF CHAPTER P1 | # 1 | 0% |

| IDENTIFICATION INFORMATION OF PRE-BUFFERING DATA | NO. OF BUFFER | AMOUNT OF STORED DATA |
|---|---|---|
| NO. OF CHAPTER P2 | # 2 | 0% |
| NO. OF CHAPTER P3 | # 3 | 0% |
| ⋮ | | |

FIG. 10

| IDENTIFICATION INFORMATION OF NORMAL BUFFERING DATA | NO. OF BUFFER | AMOUNT OF STORED DATA |
|---|---|---|
| IDENTIFICATION INFORMATION OF FRONT-END OF CHAPTER P1 | # 1 | 100% |
| IDENTIFICATION INFORMATION OF PRE-BUFFERING DATA | NO. OF BUFFER | AMOUNT OF STORED DATA |
| NO. OF CHAPTER P2 | # 2 | 0% |
| NO. OF CHAPTER P3 | # 3 | 0% |
| ⋮ | | |

FIG. 11

| IDENTIFICATION INFORMATION OF NORMAL BUFFERING DATA | NO. OF BUFFER | AMOUNT OF STORED DATA |
|---|---|---|
| IDENTIFICATION INFORMATION OF FRONT END OF CHAPTER P1 | # 1 | 100% |
| IDENTIFICATION INFORMATION OF PRE-BUFFERING DATA | NO. OF BUFFER | AMOUNT OF STORED DATA |
| NO. OF CHAPTER P2 | # 2 | 100% |
| NO. OF CHAPTER P3 | # 3 | 100% |
| ⋮ | | |

FIG. 12

| IDENTIFICATION INFORMATION OF NORMAL BUFFERING DATA | NO. OF BUFFER | AMOUNT OF STORED DATA |
|---|---|---|
| IDENTIFICATION INFORMATION OF FRONT END OF CHAPTER P2 | # 2 | 100% |
| IDENTIFICATION INFORMATION OF PRE-BUFFERING DATA | NO. OF BUFFER | AMOUNT OF STORED DATA |
| NO. OF CHAPTER P1 | # 1 | 0% |
| NO. OF CHAPTER P3 | # 3 | 100% |
| ⋮ | | | though the network, the data of the jump destination corresponding to the jump-destination information and can buffer the received data.

PLAYBACK APPARATUS, METHOD, AND PROGRAM

CROSS REFERENCE TO RELATED APPLICATIONS

The present application is a national phase entry under 35 U.S.C. §371 of International Application No. PCT/JP2007/062568 filed Jun. 22, 2007, published on Dec. 27, 2007 as WO 2007/148777 A1, which claims priority from Japanese Patent Application No. JP 2006-172751 filed in the Japanese Patent Office on Jun. 22, 2006.

TECHNICAL FIELD

The present invention relates playback apparatuses, methods, and programs. In particular, the present invention relates to a playback apparatus, a method, and a program which are adapted to allow jump playback to be appropriately performed when content supplied through a network is played back in real time.

BACKGROUND ART

A video-on-demand (VOD) system is available that connects a video server in which video/audio information is stored and a user terminal over a network and that can provide video and audio from the video server to the user terminal in real time in accordance with a user's request.

In the VOD system, for example, the video server reads stored data in accordance with a request received from the user terminal and outputs a video/audio stream to the user terminal.

The user terminal receives the stream data transmitted from the video server and plays back the stream data. In addition, the user terminal plays back the received stream data while buffering it in a buffer so that transmission fluctuations due to network delay and so on occurred during transmission/reception of the stream data through the network can be absorbed so as to perform appropriate playback.

Thus, the user terminal plays back the stream data after data having an amount of data that allows playback is stored in the buffer.

A configuration in which a buffer is provided at the video server has also been developed (refer to Patent Document 1).
[Patent Document 1] Japanese Unexamined Patent Application Publication No. 2003-209823

DISCLOSURE OF INVENTION

Problems to be Solved by the Invention

During streaming playback of the VOD system, it is possible to perform jump playback in which a playback position is changed to, for example, the position of a predetermined mark given to content. In response to a request for jump playback, a request for data at a specified jump destination is issued to the video server and jump-destination streaming data transmitted from the video server in response to the request is buffered and played back.

Thus, in the known VOD system, after the request for jump playback is issued, the content data of the jump destination is buffered. Thus, during the buffering, the playback is stopped and the operation enters a playback-waiting state.

When the playback waiting occurs in such a manner, playback video is consequently interrupted in an unusual manner and it is thus difficult to view the video. When jump playback is repeatedly performed in order to search for a desired scene, the search requires a time corresponding to the amount of the playback waiting. In addition, when a jump destination is not so far from a current playback position, continuously performing the playback allows the portion of the jump destination to be more promptly viewed/listened to in some cases than performing jump playback.

Conventionally, when content supplied through a network is played back in real time, jump playback cannot be appropriately performed in some cases, as described above.

The present invention has been conceived in view of such situations, and is intended to allow jump playback to be appropriately performed when content supplied from a server connected through a network is played back in real time.

Means for Solving the Problems

A playback apparatus according to one aspect of the present invention performs real-time playback of content transmitted through a network and is capable of performing jump playback from a specified position. The playback apparatus includes: buffering means for receiving, through the network, data of content to be played back from now and buffering the received data; playback means for playing back the data buffered by the buffering means; and specifying means for specifying a jump destination for jump playback. The buffering means further receives, through the network, data of a jump destination or jump destinations that can be specified by the specifying means and buffers the received data. When the specifying means specifies the jump destination and the buffering means buffers the data of the jump destination, the playback means performs jump playback from the buffered data.

The playback apparatus can further include obtaining means for obtaining, from a server that provides the content, information of the jump destination or jump destinations that can be specified by the specifying means. Based on the jump-destination information obtained by the obtaining means, the buffering means can receive, through the network, the data of the jump destination or jump destinations that can be specified by the specifying means and can buffer the received data.

When multiple jump destinations that can be specified by the specifying means exist, the buffering means can receive, through the network in a predetermined order, the data of the jump destinations that can be specified by the specifying means and can buffer the received data.

When multiple jump destinations that can be specified by the specifying means exist, the buffering mean can receives, through the network, only the data of a predetermined one of the jump destinations that can be specified by the specifying means and can buffer the received data.

When a request for jump playback is issued, the buffering means can receive, through the network, only the data of a jump destination corresponding to a position of the jump destination of the requested jump playback out of the jump destinations that can be specified by the specifying means, and can perform buffering.

The playback apparatus can further include: obtaining means for obtaining multiple types of jump-destination information for the content to be played back; presenting means for presenting selection information of the multiple types of jump-destination information obtained by the obtaining means; and selecting means for selecting predetermined selection information from the selection information presented by the presenting means. Based on the jump-destination information corresponding to the selection information selected by the selecting means, the buffering means receives, through the network, the data of the jump-destinations that can be specified by the specifying means and buffers the received data.

The specifying means can include displaying means for displaying a list of the jump destinations, and jump-destination specifying means for specifying a predetermined jump destination of the jump-destination list displayed by the displaying means. The buffering means can receive, through the network, the data of the jump destinations that can be specified by the specifying means and can buffer the received data, in a predetermined order from the jump destination specified by the jump-destination specifying means.

The jump-destination specifying means can include candidate specifying means for specifying a jump-destination candidate out of the jump destinations displayed in the jump-destination list, and jump-destination deciding means for deciding the jump-destination candidate as a jump destination. The buffering means can receive, through the network, the data of the jump destinations that can be specified by the specifying means and can buffer the received data, in a predetermined order from the jump destination specified as the jump-destination candidate when the candidate specifying means specifies the jump-destination candidate.

The displaying means can control the display of the jump-destination list so that display of the jump destination specified by the candidate specifying means or a vicinity of the specified jump destination is highlighted compared to display of other jump destinations.

A playback method or a program according to one aspect of the present invention is directed to a playback method for a playback apparatus that performs real-time playback of content transmitted through a network and that is capable of performing jump playback from a specified position or to a program for causing a computer to execute playback processing for performing real-time playback of content transmitted through a network and performing jump playback from a specified position. The playback method or the program includes: a buffering step of receiving, through the network, data of content to be played back from now and buffering the received data; a playback step of playing back the data buffered in the processing of the buffering step; and a specifying step of specifying a jump destination for jump playback. In the buffering step, data of a jump destination or jump destinations that can be specified in the processing of the specifying step is further received through the network and is buffered. When the jump destination is specified in the processing of the specifying step and the data of the jump destination is buffered in the processing of the buffering step, jump playback from the buffered data is performed in the playback step.

In the playback apparatus, the playback method, or the program according to the present invention, data of content to be played back from now is received through the network and is buffered, and the buffered data is played back. Data that can become jump destinations is received through the network and is buffered. When a jump destination is specified and the data of the jump destination is buffered, jump playback from the buffered data is performed.

Advantages

According to the present invention, when content supplied through a network is played back in real time, jump playback can be appropriately performed.

DETAILED DESCRIPTION OF THE DRAWINGS

FIG. 8 is a table showing an example of a buffering list.

FIG. 10 is a table showing another example of the buffering list.

FIG. 11 is a table showing another example of the buffering list.

FIG. 12 is a table showing another example of the buffering list.

Figure 1:
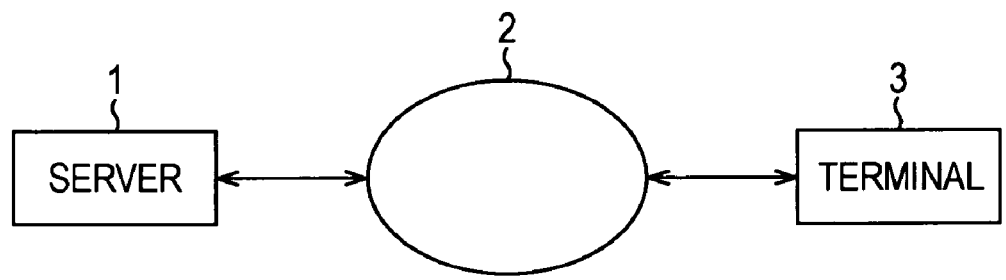
FIG. 1 is a block diagram showing a configuration example of a streaming system according to the present invention.

REFERENCE NUMERALS 1 server, 2 network, 3 terminal, 11 content storage unit, 12 jump-destination-information storage unit, 13 switch unit, 14 communication unit, 15 control unit, 21 communication unit, 22 switch unit, 23 jump-destination-information storage unit, 24 buffers, 25 switch unit, 26 decoding unit, 27 output unit, 28 input unit, 29 control unit, 51 server, 61 jump-destination-information storage unit, 101 content jump-destination information list, 121 jump-destination list

BEST MODE FOR CARRYING OUT THE INVENTION

FIG. 1 shows a configuration example of a streaming system according to the present embodiment.

A server 1 stores video/audio information (hereinafter referred to as "content") to be supplied to a terminal 3. In response to a request from the terminal 3, the server 1 supplies the content in real time (e.g., outputs a video/audio stream constituting the content).

The terminal 3 receives, for example, stream data transmitted from the server 1 and buffers the stream data and plays back the buffered data. In the case of this example, the terminal 3 has multiple buffers to cause content data of jump destinations which are likely to be subjected to jump playback to be stored in the multiple buffers.

In response to a request for jump playback, the terminal 3 performs jump playback from the pre-buffered data.

Thus, since the terminal 3 pre-buffers jump-destination data that can be subjected to jump playback, it is possible to perform jump playback without delay.

For example, when a network 2 is a home network, the server 1 is, for example, a DVD player or a recording/playback apparatus employing a HDD (hard disk drive) and the terminal 3 is, for example, a DVD player, a recording/playback apparatus, or a television receiver. For example, when the network 2 is the Internet, the server 1 is, for example, a content distribution server and the terminal 3 is, for example, a PC (personal computer) serving as a playback apparatus, a mobile telephone, or the like.

Figure 2:
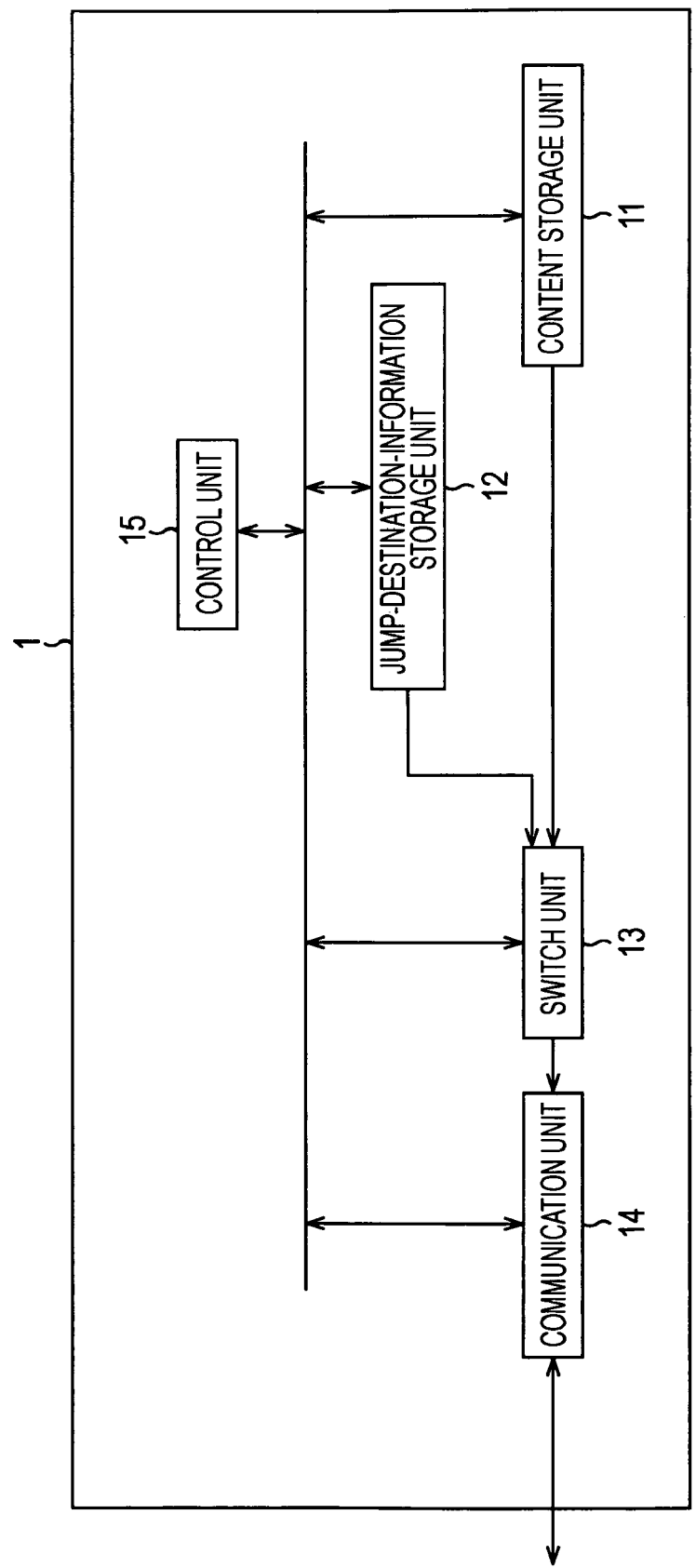
FIG. 2 is a block diagram showing a configuration example of a server 1 shown in FIG. 1.

FIG. 2 shows a configuration example of the server 1.

A content storage unit 11 stores content to be supplied to the terminal 3.

A jump-destination-information storage unit 12 stores information indicating the positions of jump destinations that can be subjected to jump playback (the information will hereinafter be referred to as "jump-destination information") during playback of the content stored in the content storage unit 11.

For example, a case in which the server 1 is a DVD player will be discussed. When a movie recorded on a DVD is supplied to the terminal 3, jump playback can be performed for a chapter set for each scene in the movie. Thus, in this case, for example, the number of each chapter is stored as the jump-destination information.

A case in which the server 1 is a recording/playback apparatus including a HDD will also be discussed. When a broadcast program recorded on the HDD is supplied to the terminal 3, jump playback can be performed for each chapter set for a scene or a commercial-message area in the broadcast program. Thus, in this case, for example, the number of each chapter is stored as the jump-destination information.

A case in which the server 1 is a recording/playback apparatus including a HDD will also be discussed. When a private video captured by a camcorder and recorded on the HDD is supplied to the terminal 3, jump playback can be performed for marks given by a photographer or the camcorder during the capture using the camcorder. Thus, in this case, information indicating a position in content, the position being indicated by each mark, is stored as the jump-destination information.

In accordance with control of a control unit 15, a switch unit 13 reads content data from the content storage unit 11 in which the content data is stored and supplies the read content data to a communication unit 14 or reads the jump-destination information from a jump-destination-information storage unit 12 in which the jump-destination information is stored and supplies the read jump-destination information to the communication unit 14.

The communication unit 14 is connected to the network 2 to transmit the content data or jump-destination information, supplied from the switch unit 13, to the terminal 3 through the network 2.

The control unit 15 has a CPU, a RAM, and a ROM, controls the entire server 1, and transmits the content or the jump-destination information to the terminal 3 through the network 2.

Figure 3:
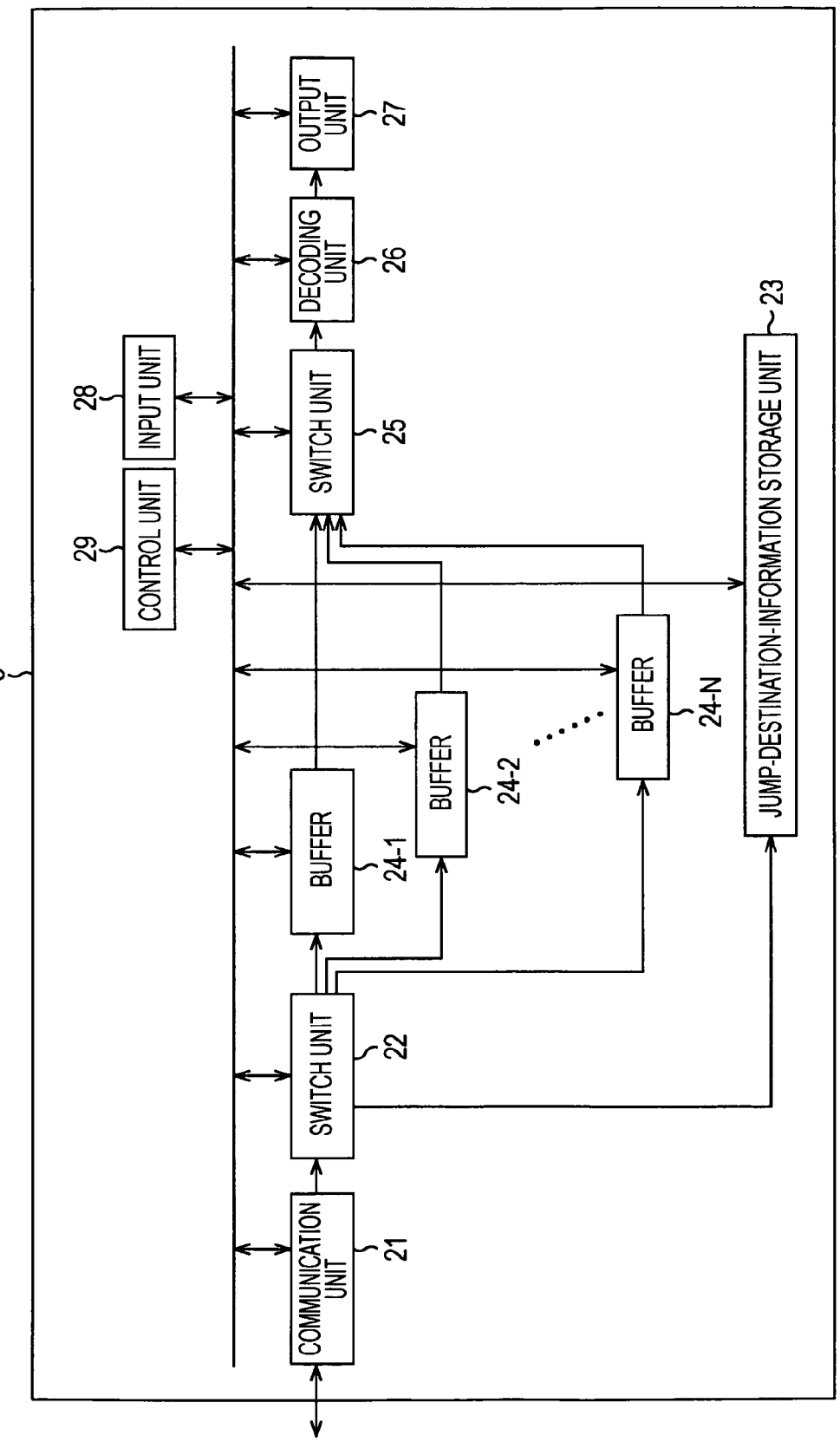
FIG. 3 is a block diagram showing a configuration example of a terminal 3 shown in FIG. 1.

FIG. 3 shows a configuration example of the terminal 3.

A communication unit 21 receives the content or jump-destination information transmitted from the server 1 through the network 2 and supplies the content or jump-destination information to a switch unit 22.

In accordance with control of a control unit 29, the switch unit 22 supplies the jump-destination information, supplied from the communication unit 21, to a jump-destination-information storage unit 23, or supplies sorted data of the content, supplied from the communication unit 21, to N buffers 24-1 to 24-N (hereinafter referred to as buffers 24, unless they need to be distinguished from each other)

The jump-destination-information storage unit 23 stores the jump-destination information supplied from the switch unit 22.

The buffers 24 temporarily store the content data supplied from the switch unit 22 and supply the content data to a switch unit 25 in response to the content data read from the switch unit 22.

In accordance with control of the control unit 29, the switch unit 25 reads the data from the predetermined buffer 24 and supplies the data to a decoding unit 26.

The decoding unit 26 decodes the data supplied from the switch unit 25 and supplies the resulting video/audio data to an output unit 27.

The output unit 27 supplies video signals, supplied from the decoding unit 26, to a display unit, which is not shown, to cause video corresponding to the video signals to be displayed, and supplies audio signals to a speaker, which is not shown, to cause sound corresponding to the audio signals to be output.

An input unit 28 inputs the contents of a user operation performed on an operation unit, which is not shown, and sends a notification to the control unit 29.

The control unit 29 controls the individual units to execute playback processing of the content supplied from the server 1.

Next, the operation of the terminal 3 will be described separately with respect to buffering processing and playback processing. With reference to flowcharts shown in FIGS. 4 to 7, an overview thereof will first be described and details thereof will then be described.

Buffering processing will first be described with reference to the flowcharts shown in FIGS. 4 to 6.

When a playback instruction is input from the input unit 28 of the terminal 3, in step S1, the control unit 29 issues, to the server 1 via the communication unit 21, a request for transmitting the jump-destination information of content to be played back.

In step S2, the control unit 29 controls the communication unit 21 to receive the jump-destination information transmitted from the server 1 in response to the request issued in step S1, and controls the switch unit 22 to supply the jump-destination information to the jump-destination-information storage unit 23 for storage.

Next, in step S3, the control unit 29 creates a buffering list, based on the jump-destination information stored in the jump-destination-information storage unit 23.

Details of this processing will be described with reference to the flowchart shown in FIG. 5.

In step S11, the control unit 29 of the terminal 3 determines whether or not playback has been started. When it is determined that playback has been started, the process proceeds to step S12, in which the control unit 29 detects a buffer 24 in which data to be played back from now is stored.

Next, in step S13, information required for buffering for the playback that is currently performed (the information will hereinafter be referred to as "normal buffering information") is set in the buffering list.

For example, with respect to the data to be played back from now, identification information of data that needs to be buffered to continue the playback (the data will hereinafter be referred to as "normal buffering data"), the number of the buffer 24 in which the normal buffering data is to be buffered, and the current amount of data stored in the buffer 24 in which the normal buffering data is to be buffered are set as the normal buffering information.

In step S14, the control unit 29 determines whether or not all buffering of portions that can become jump destinations (the portions are, for example, chapters and/or portions to which marks are attached) (the portions are hereinafter be referred to as "pre-buffering data") has been completed.

In this case, when the buffering is completed, this means that the buffers 24 store data having an amount of data that allow processing, such as decoding, to be started.

When it is determined in step S14 that pre-buffering data whose buffering has not been completed exists, the process proceeds to step S15. The control unit 29 then determines a buffer 24 for buffering the pre-buffering data whose buffering has not been completed.

Next, in step S16, the control unit 29 sets information required for buffering the pre-buffering data (the information will hereinafter be referred to as "pre-buffering information") in the buffering list.

For example, identification information of the pre-buffering data, the number of the buffer 24 determined in step S15 as a buffer in which the pre-buffering data is to be buffered, and the current amount of data in the buffer 24 in which the pre-buffering data is to be buffered are set as the pre-buffering information.

Figure 4:
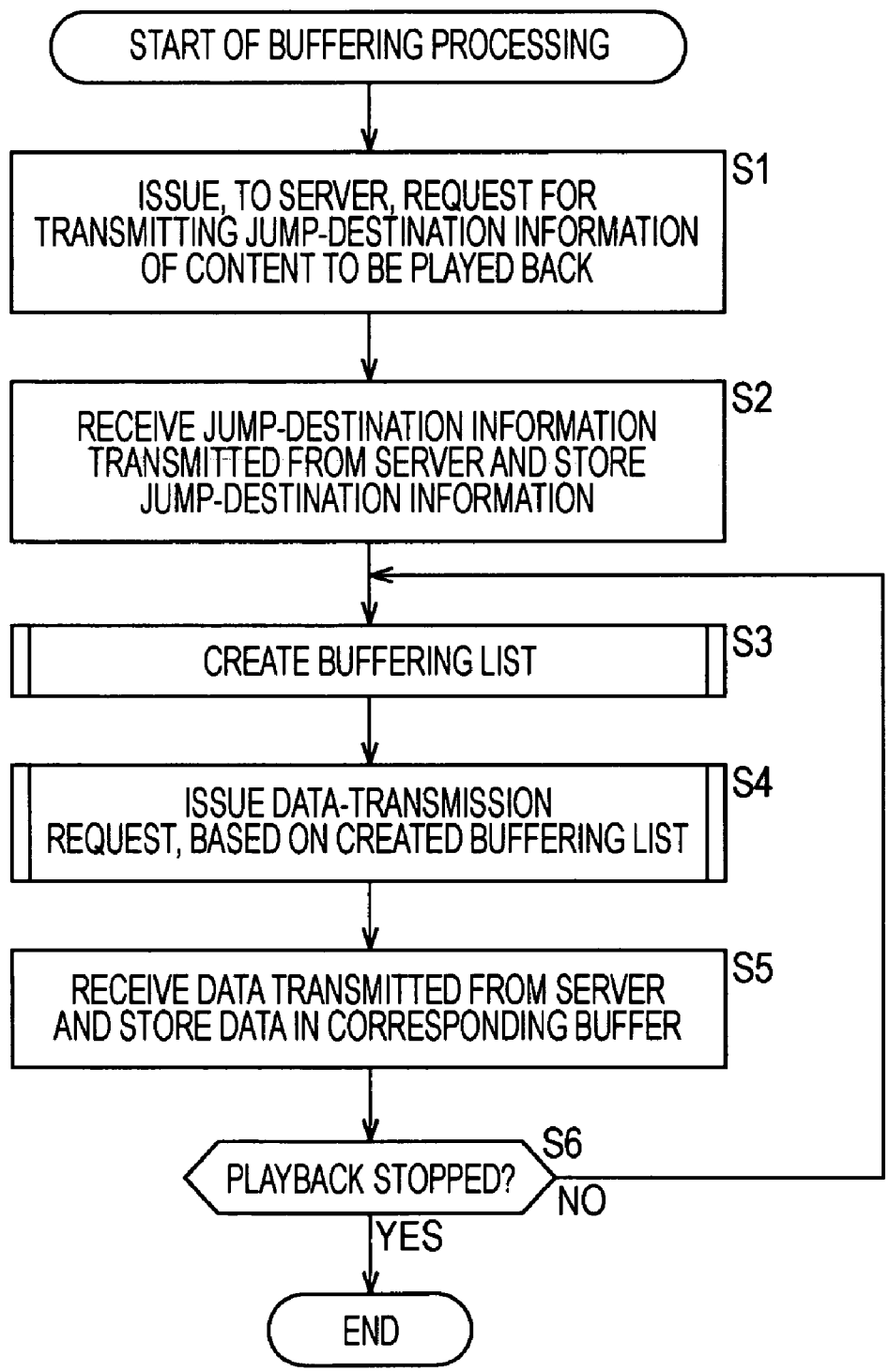
FIG. 4 is a flowchart illustrating buffering processing of the terminal 3.

When it is determined in step S14 that all buffering of the pre-buffering data has been completed or when it is determined in step S15 that the pre-buffering information is set in the buffering list, the process proceeds to step S4 shown in FIG. 4.

In step S4, the control unit 29 of the terminal 3 issues a data-transmission request to the server 1, based on the buffering list generated in step S3.

Figure 6:
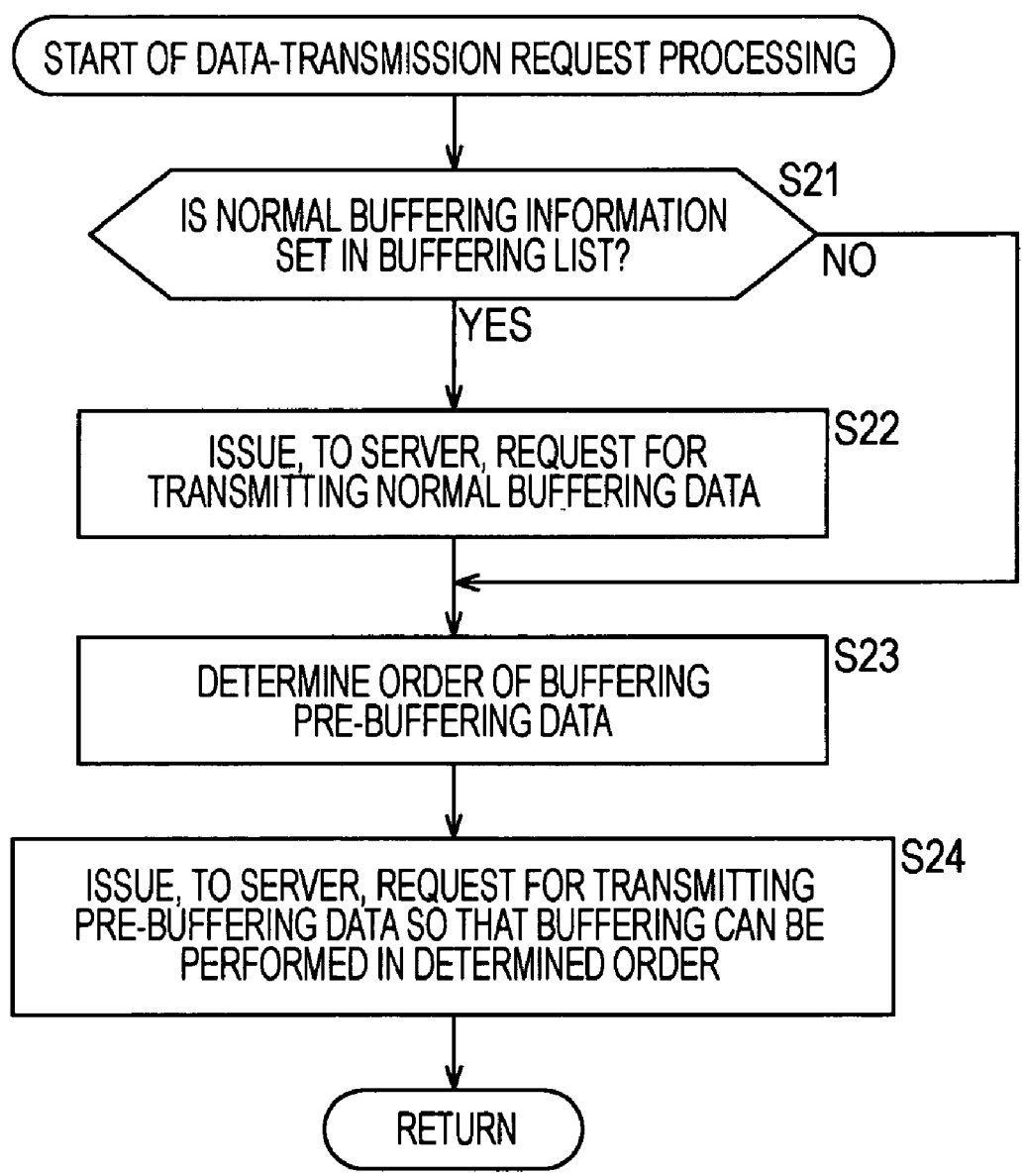
FIG. 6 is a flowchart illustrating data-transmission request processing in step S4 shown in FIG. 4.

Details of this processing are shown in the flowchart in FIG. 6.

That is, in step S21, the control unit 29 of the terminal 3 determines whether or not normal buffering information is set in the buffering list. When it is determined that normal buffering information is set, the process proceeds to step S22. The control unit 29 then issues, to the server 1, a request for transmitting normal buffering data.

For example, the control unit 29 controls the communication unit 21 to transmit the normal-buffering-data identification information, read from the normal buffering information, to the server 1.

The request for transmitting the normal buffering data is issued as described above and the data transmitted in response to the request is buffered in step S5 described below and shown in FIG. 4. Consequently, the playback that is currently being played back can be performed without interruption.

When it is determined in step S21 that normal buffering information is not set or when it is determined in step S22 that a request for transmitting normal buffering data is issued, in step S23, the control unit 29 sequentially determines the order of buffering the pre-buffering data.

Next, in step S24, the control unit 29 issues, to the server 1, a request for transmitting the pre-buffering data so that the pre-buffering data is buffered in the determined order.

For example, the control unit 29 transmits the pre-buffering-data identification information, read from the pre-buffering information, to the server 1 via the communication unit 21 in the determined order.

When the request for the data transmission is issued to the server 1, as described above, the process proceeds to step S5 shown in FIG. 4.

In step S5, the control unit 29 of the terminal 3 controls the switch unit 22 to cause the data, transmitted in response to the request issued in step S4 and received by the communication unit 21, to be stored in the buffer 24 indicated by the buffering list.

Next, in step S6, the control unit 29 determines whether or not an instruction for stopping the playback is input from the input unit 28. When it is determined that the playback stop instruction is not input, the process returns to step S3 and the subsequent processing is executed in the same manner.

When it is determined in step S6 that the playback stop instruction is input, the buffering processing ends.

An overview of playback processing performed by the terminal 3 will be described next with reference to the flowchart shown in FIG. 7.

In step S51, the control unit 29 refers to the normal buffering information set in the buffering list to detect a buffer 24 in which the normal buffering data is buffered.

In step S52, the control unit 29 determines whether or not the buffering of the normal buffering data has been completed, and waits until it can determine that the buffering has been completed.

For example, the control unit 29 refers to the amount of stored data in the normal buffering information to determine whether or not the buffering of the normal buffering data has been completed.

When it is determined in step S52 that the buffering of the normal buffering data has been completed, the process proceeds to step S53. The control unit 29 then controls the switch unit 25 to read, from the buffer 24 in which the normal buffering data is buffered, data suitable for decoding. In step S54, the control unit 29 causes the read data to be supplied to the decoding unit 26 and to be decoded. The decoded data is output via the output unit 27.

Next, in step S55, the control unit 29 determines whether or not an instruction for stopping the playback is input from the input unit 28. When it is determined that the playback stop instruction is not input, the process returns to step S53 and the subsequent processing is executed in the same manner.

After the buffering is completed in step S52, a certain amount of data is replenished (in step S5 in FIG. 4). Thus, typically, the data read in step S53 has been stored in the buffer 24. However, when the amount of data read in step is not stored in the buffer 24 for some inconvenience, the data reading in step S53 is stopped until the corresponding amount of data is stored.

As a result of the repeated execution of the processing in steps S53 to S55, as described above, the decoded content data is output and the content is played back.

When it is determined in step S55 that a playback stop instruction is input, the control unit 29 stops the playback processing.

Next, the above-described buffering processing and playback processing will be described more specifically with reference to a buffering list shown in FIG. 8.

When the jump-destination information of the content to be played back is stored (in steps S1 and S2 in FIG. 4), a buffering list is created (in step S3).

Figure 5:
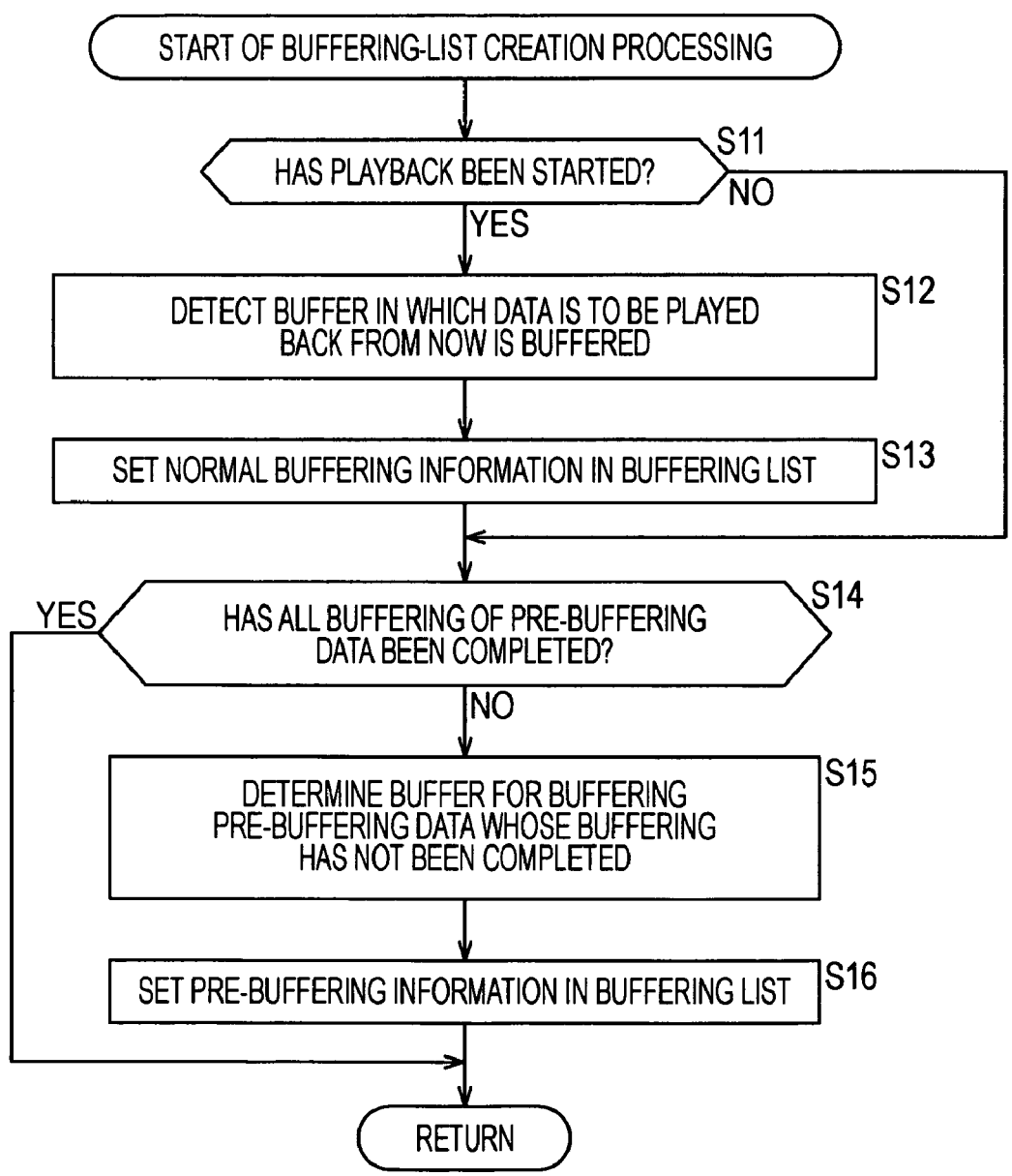
FIG. 5 is a flowchart illustrating buffering-list creation processing in step S3 shown in FIG. 4.

More specifically, for example, the buffer 24-1 is detected as the buffer 24 for buffering data to be played back from now (in steps S11 and S12 in FIG. 5).

As a result, as shown in FIG. 8, the identification information of a front-end portion of a first chapter P1 of the content, and the number (#1) of the buffer 24-1 in which a portion of the chapter P1 is to be buffered (the portion will be hereinafter simply referred to as a "chapter P1", as needed), and the current amount of data stored in the buffer 24-1 are set in the buffering list as the normal buffering information (in step S13).

In the case of this example, it is assumed that the same numerals that follow hyphens (-) are assigned to the buffers 24-1 to 24-N shown in FIG. 3 as the numbers of the buffers 24.

In the case of this example, the current amount of data stored in the buffer 24 in which the normal buffering data is to be buffered is expressed by a rate when the amount of data with which playback processing, such as decoding, can be started is 100%. In this case, since no data has been stored in the buffer 24-1, the amount of stored data is 0%.

In this case, since the buffering of the pre-buffering data has not been completed (in step S14), the buffers 24-2, 24-3, . . . in which chapters P2 and P3 subsequent to the chapter 1, which serve as the pre-buffering data, are to be buffered are determined (in step S15), and the numbers of the chapters P including the chapter P2 and the subsequent chapter, which serve as the pre-buffering data, the numbers of the buffers 24 in which the determined chapters P are to be buffered, and the amounts of data stored in the buffers 24 are set as the pre-buffering information (in step S16).

When a buffering list as shown in FIG. 8 in which normal buffering information and pre-buffering information are set is created (in step S3 in FIG. 4), a request for transmitting the data is issued to the server 1 based on the buffering list (in step S4).

In this case, the identification information of the chapter P1, which is normal buffering data, is first transmitted to the server 1 to request the transmission of the data (in step S22 in FIG. 6).

In this case, since buffering is performed in order of the chapter P2, the chapter P3, . . . (in step S23), the identification information of the chapters P is transmitted to the server 1 in that order and the request for data transmission in that order is issued (in step S24).

Buffering pre-buffering data in order of playback, as described above, makes it possible to promptly perform jump playback for a chapter to be played back subsequently to a chapter that is being played back.

When the data transmission request is issued to the server 1, as described above, the data transmitted from the sever 1 in response to the request is stored (in step S5 in FIG. 4).

Figure 9:
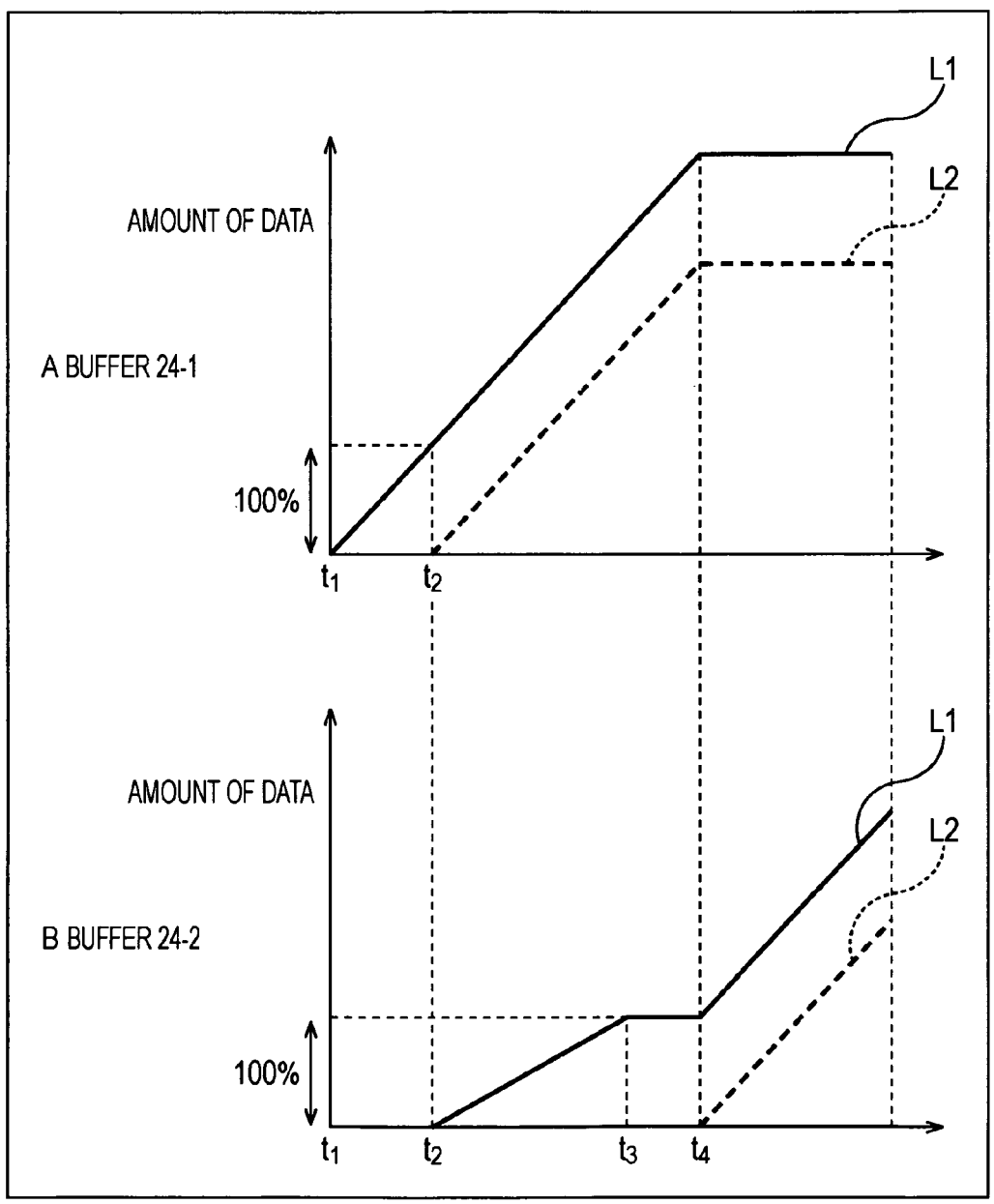
FIG. 9 is a graph showing transitions of the amounts of data stored in buffers 24.

In the case of this example, since the data of the chapter P1 is first transmitted from the sever 1, the storage of the chapter P1 into the buffer 24-1 is started, for example, at time t1, as indicated by a solid line L1 shown in part A of FIG. 9.

In this case, as indicated by a solid line L1 shown in part B of FIG. 9, after the buffering of the chapter P1 is completed (at time t2), the storage of the chapter P2, which serves as pre-buffering data, is started.

Alternatively, although not shown, the storage of chapters P that are buffered after the chapter P2 is also started after the buffering of the previous chapters P is completed.

The solid lines L1 shown in parts A and B of FIG. 9 represent transitions of the amounts of data stored in the buffers 24.

After time t2, the normal buffering data for continuously performing the playback is transmitted from the server 1, and as indicated by the solid line L1 in part A of FIG. 9, the normal buffering data is buffered. Thus, the pre-buffering data is transmitted from the server 1 by using a band that is not used for transmitting the normal buffering data. Consequently, the transmission speed of the pre-buffering data may be lower than the transmission speed of the normal buffering data. In this case, as indicated by the solid line in part B of FIG. 9, the storage speed of the pre-buffering data into the buffer 24 becomes lower than the storage speed of the normal buffering data.

The buffering-list creation (in step S3 in FIG. 4) in the buffering processing, the data transmission request based on the buffering list (in step S4), and the data storage (in step S5) are repeatedly performed until the playback is stopped.

When the buffering of the normal buffering data is completed, for example, a buffering list as shown in FIG. 10 is created. In this buffering list, the amount of data stored in the buffer 24-1 for buffering the normal buffering data is 100%.

Further, when all buffering of the pre-buffering data is completed, a buffer list as shown in FIG. 11 is created. In this buffering list, the amounts of data stored in all buffers 24 for buffering the pre-buffering data are 100%.

When the playback proceeds or a jump-playback request is issued, the normal buffering information is updated (in steps S12 and S13 in FIG. 5) (in step S3 in FIG. 4), a request for transmitting data according to the normal buffering information is issued (in step S4), and the data is stored (in step S5).

For example, when a jump-playback request is issued for the chapter P2, the buffer 24 in which data to be played back from now is buffered is the buffer 24-2 (in step S12 in FIG. 5), a buffering list as shown in FIG. 12 is created. In this buffering list, the identification information of the front end of the chapter P2, the number of the buffer 24-2 in which the chapter P2 is to be buffered, and the current amount (100%) of data stored in the buffer 24-2 are set as the normal buffering information. Based on the buffering list, the data transmission request is issued and the data is stored.

The buffering processing is performed as described above.

In the playback processing, on the other hand, when it is detected from the normal buffering information in the buffering list (FIG. 8) that the buffer 24 in which the normal buffering data is buffered is the buffer 24-1 (in step S51 in FIG. 7) and the amount of data stored in the buffer 24-1 which is shown in the buffering list is 100%, as shown in FIG. 10, that is, when it is determined that the buffering of the normal buffering data has been completed (in step S52), a certain amount of data is read from the buffer 24-1 (in step S53) and the data is decoded and output (in step S54). Since the data reading and decoding processing is repeated until the playback stop instruction is issued, the playback from the chapter P1 is performed as indicated by a dotted line L2 in part A of FIG. 9.

Figure 7:
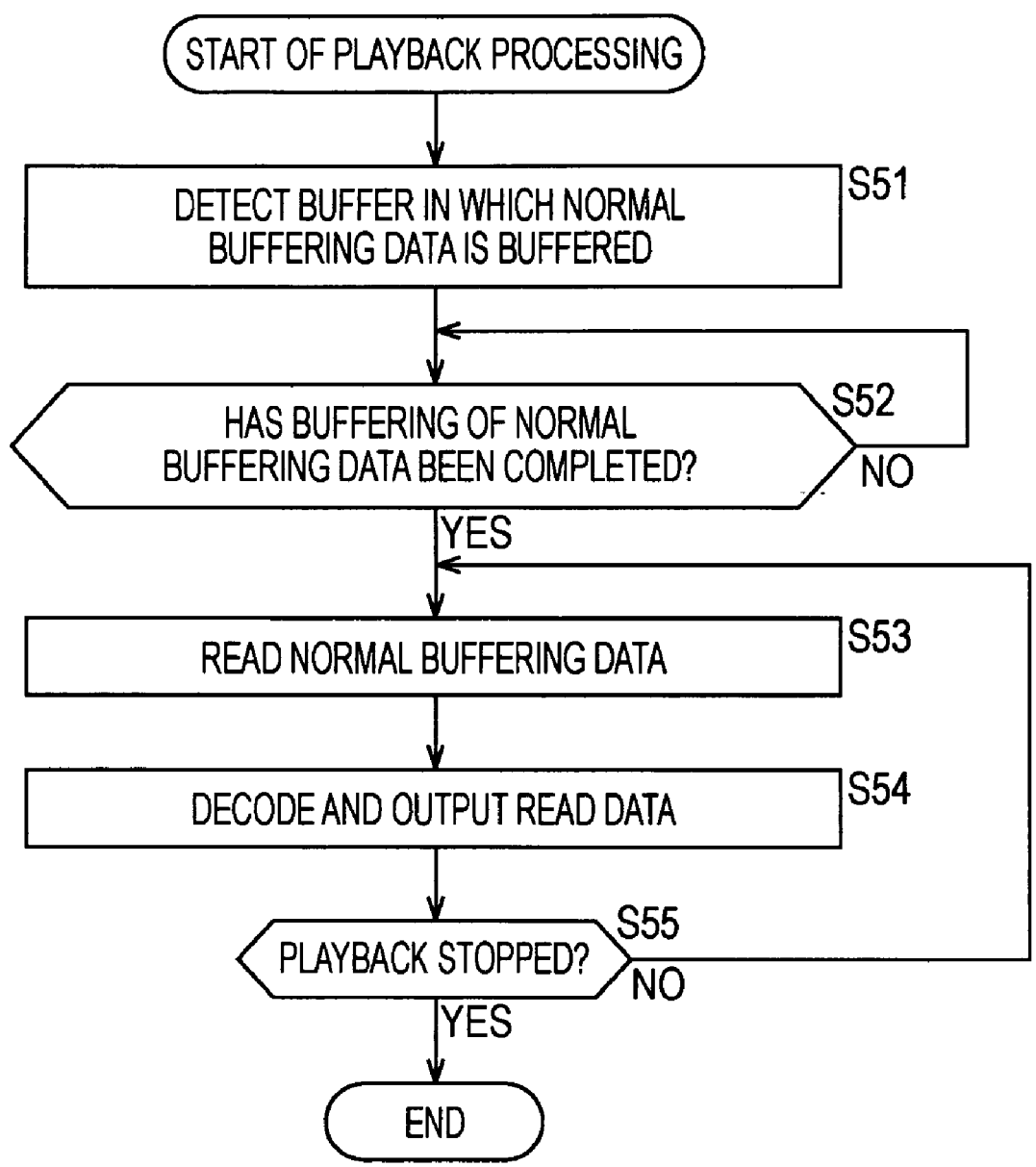
FIG. 7 is a flowchart illustrating playback processing of the terminal 3.

For example, when a jump-playback request for the chapter P2 is issued at time t4, as shown in parts A and B of FIG. 9, it is detected from the normal buffering information (FIG. 12) in the buffering list that the buffer 24 in which the normal buffering data is buffered is the buffer 24-2 (In step S51 in FIG. 7). As shown in FIG. 12, however, since the amount of data stored in the buffer 24-2 which is shown in the buffering list is 100%, that is, since the buffering of the normal buffering data has been completed as indicted by the solid line L1 in part B of FIG. 9 (in step S52), a certain amount of data is read from the buffer 24-2 from time t4 (in step S53) and the data is decoded and output (in step S54). Since the data reading and decoding processing is repeated until the playback stop instruction is issued, the jump playback from the chapter P2 is performed as indicated by the dotted line L2 in part B of FIG. 9.

The dotted lines L2 shown in parts A and B of FIG. 9 represent transitions of the amounts of data read from the buffers 24.

As described above, the pre-buffering data is pre-buffered, for example, in parallel with the playback processing. Thus, even when a jump-playback request is issued, the playback from its jump destination can be promptly performed.

Since the jump playback can be promptly performed as described above, search for the jump playback can also be promptly performed. Also, even when a destination is not so far from the current playback position, the jump playback allows the portion of the jump destination to be more promptly viewed/listened to.

In the above description, the buffering of the pre-buffering data is started after the buffering of the normal buffering data is completed, and the buffering of the pre-buffering data is started after the buffering of the previous pre-buffering data is completed, as shown in parts A and B of FIG. 9. However, those buffering operations may be performed at the same time or may be partly performed in parallel.

Although an example in which buffering is performed for all jump destinations has been described above, it is also possible to perform buffering for only specific jump destinations, such as buffering for only a few chapters before and after a chapter that is currently being played back.

A case in which buffering is performed for predetermined jump destinations has been described above by way of example. However, for example, when jump playback is executed, a jump destination for which buffering is performed can be changed in accordance with the position of the jump destination.

Figure 13:
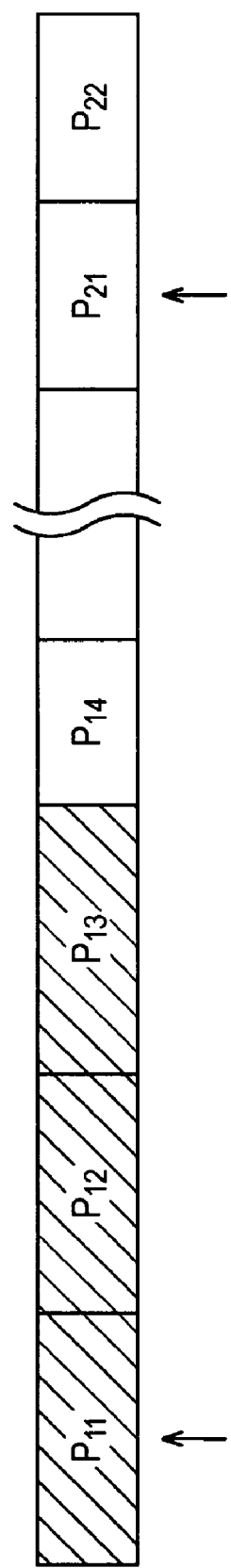
FIG. 13 is a diagram illustrating the order of buffering pre-buffering data.

An example in which chapters P are buffered, for example, in order of playback will be described with reference to FIG. 13. In a state in which the buffering up to a chapter P13 is completed in order of playback (in the figure, the buffering for chapters P shown by hatching is completed), when jump playback for a chapter P21 is performed during playback of a chapter P11, buffering for a chapter P22 and the subsequent chapters can also be performed without performing buffering for a chapter P14 and the subsequent chapters.

A case in which buffering for the jump destinations is performed based on the jump-destination information supplied from the server 1 has been described above by way of example. Other than this example, the arrangement can also be such that the terminal 3 buffers data in a predetermined range of a few seconds before and after a position that is currently being played back. In this case, the present invention is also applicable to, for example, freer jump playback without depending on chapters.

The jump playback can be performed, for example, for each chapter. Thus, when different chapters are set for one piece of content, multiple types of jump-destination information corresponding to the chapter setting exist.

For example, when the content is a broadcast program, the broadcast station may provide a digest version of the broadcast program, for example, with chapters being set so that commercial messages can be easily skipped. In such a case, jump-destination information corresponding to the chapter setting exists. Also when a viewer of the broadcast program sets a chapter for a predetermined scene (e.g., a scene he or she has paid attention to) from his or her perspective, jump-destination information corresponding to the chapter setting exists.

In the above-described processing, one type of jump-destination information is supplied from the server 1 with respect to content to be played back. However, the arrangement may also be such that multiple types of jump-destination information are supplied with respect to one piece of content.

When multiple types of jump-destination information are supplied so as to allow the user of the terminal 3 to select a desired type of jump-destination information, as described above, the user of the terminal 3 can perform jump playback for each chapter corresponding to the selected jump-destination information (e.g., for each chapter set by one user) without inconvenience, such as interruption of playback video.

Figure 14:
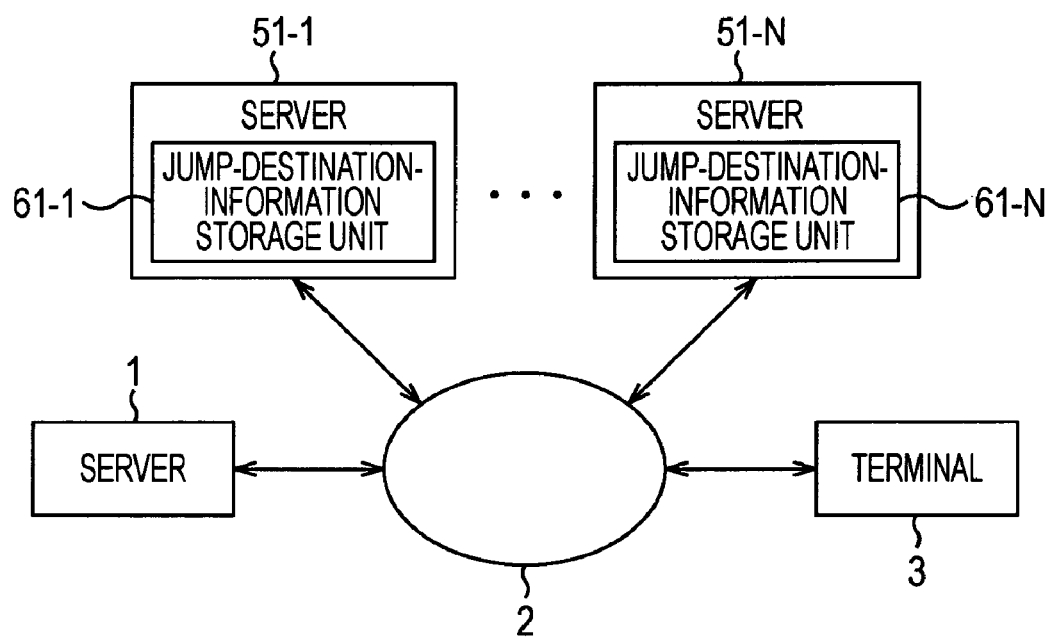
FIG. 14 is a block diagram showing another configuration example of the streaming system according to the present invention.

FIG. 14 shows a configuration example of a streaming system when multiple types of jump-destination information are supplied as described above. In addition to the server 1, the network 2, and the terminal 3 which are included in the streaming system shown in FIG. 1, this streaming system has N servers 51-1 to 51-N (The servers will hereinafter simply be referred to as "servers 51", unless they need to be distinguished from each other. This also applies to other cases).

In each server 51, jump-destination information for content to be played back by the terminal 3 (in the case of this example, content to be supplied from the server 1 to the terminal 3) is held by a built-in jump-destination-information storage unit 61. The jump-destination information held by the server 1 or 51 corresponds to chapters that the user of the server 1 or 51 uniquely set for the content.

For example, when the content is a broadcast program, the jump-destination information held by the jump-destination-information storage unit 61-1 in the server 51-1 corresponds to chapters that the broadcast station pre-set for the content, and the jump-destination information held by the jump-destination-information storage unit 61-2 in the server 51-2 corresponds to chapters that a person who is the user of the server 51-2 and who viewed/listened to the broadcast program pre-set for the chapters set for predetermined scenes in accordance with his or her perspective.

The terminal 3 receives the stream data of playback content transmitted from the server 1 and buffers the stream data for playback. During the processing, based on the jump-destination information of the content supplied from the server 1 or 51, the terminal 3 pre-buffers the data of chapters corresponding to the jump-destination information, as in the case in FIG. 1.

Upon receiving a jump-playback request during the playback of the content, the terminal 3 performs jump playback by using the pre-buffered chapter data.

The buffering processing of the terminal 3 shown in FIG. 14 will be described next with reference to the flowchart shown in FIG. 15.

When a playback instruction is input from the input unit 28 of the terminal 3, in step S101, the control unit 29 issues, to the server 1 or 51 having the jump-destination information via the communication unit 21, a request for transmitting the jump-destination information of content to be played back.

Information regarding the server 1 or 51 having the jump-destination information can be known from, for example, the provider of the content in conjunction with information required for accessing an IP address and so on.

The server 1 or 51 having the jump-destination information may also be introduced in a predetermine website or magazine, so that the user of the terminal 3 can obtain its IP address therefrom. In addition, the user of the terminal 3 may obtain a storage medium in which the IP address and so on of the server 1 or 51 that provides the jump-destination information are recorded, so that the user can read the IP address, stored in the storage medium, into the terminal 3.

In the case of this example, it is assumed that a jump-destination-information transmission request is issued to all the servers 1 and 51 that can be recognized by the terminal and that have jump-destination information regarding content to be played back. However, the arrangement can also be such that a jump-destination-information transmission request is issued to only a predetermined server 1 or 51.

In step S102, the control unit 29 controls the communication unit 21 to receive information (hereinafter referred to as "content jump-destination information") containing the jump-destination information transmitted from the server 1 or 51 in response to the request issued in step S101. Alternatively, the control unit 29 controls the switch unit 22 to supply the content jump-destination information to the jump-destination-information storage unit 23 for storage.

Figure 16:
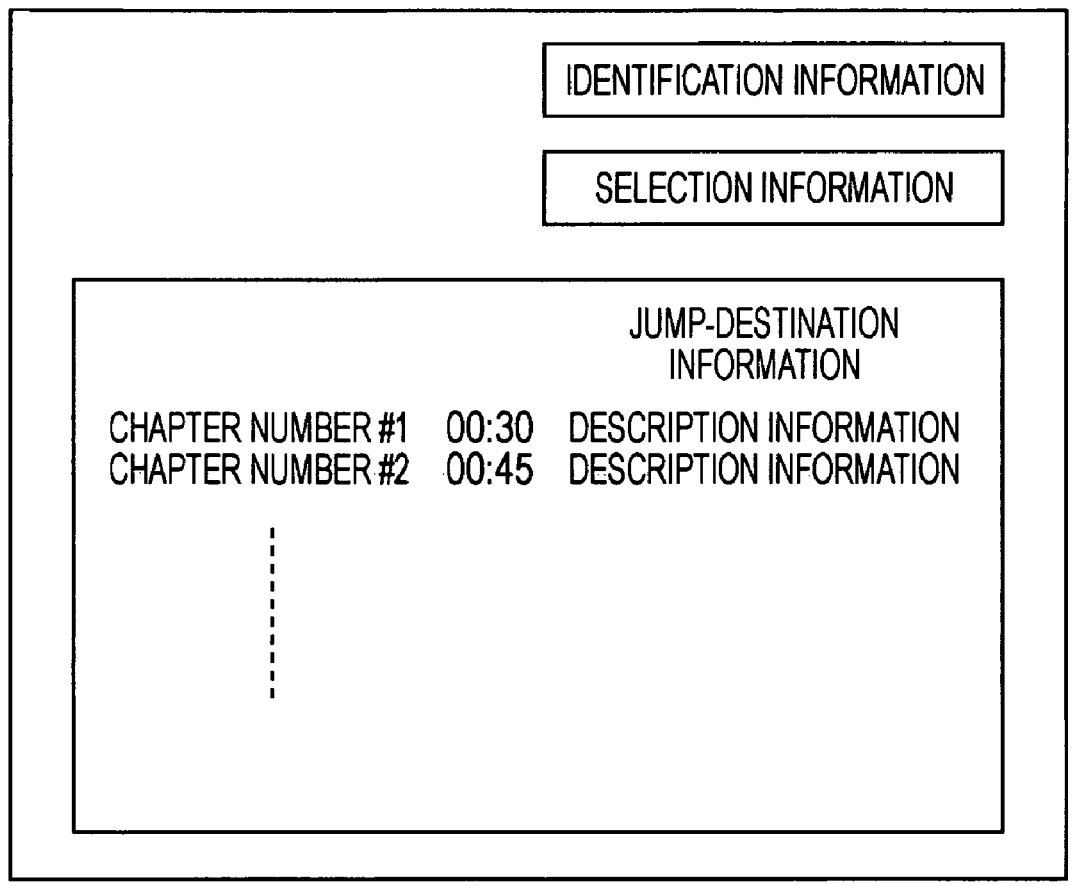
FIG. 16 is a view showing an example of content jump-destination information.

FIG. 16 shows a structure example of the content jump-destination information.

In the case of the example shown in FIG. 16, for each chapter that can become a jump destination, the content jump-destination information contains a chapter number, a position (e.g., time) from the beginning of content, and jump-destination information including description information describing a scene of the chapter, as well as identification information, such as a content name and an ID, for identifying the content and selection information displayed for selecting the jump-destination information (specifically, a type of jump-destination information), as described below.

Referring back to FIG. 15, in step S103, the control unit 29 causes a list of selection information (hereinafter referred to as a "content jump-destination information list"), contained in the content jump-destination information transmitted from the server 1 or 51 and received in step S102, to be displayed on the display unit via the output unit 27.

Figure 17:
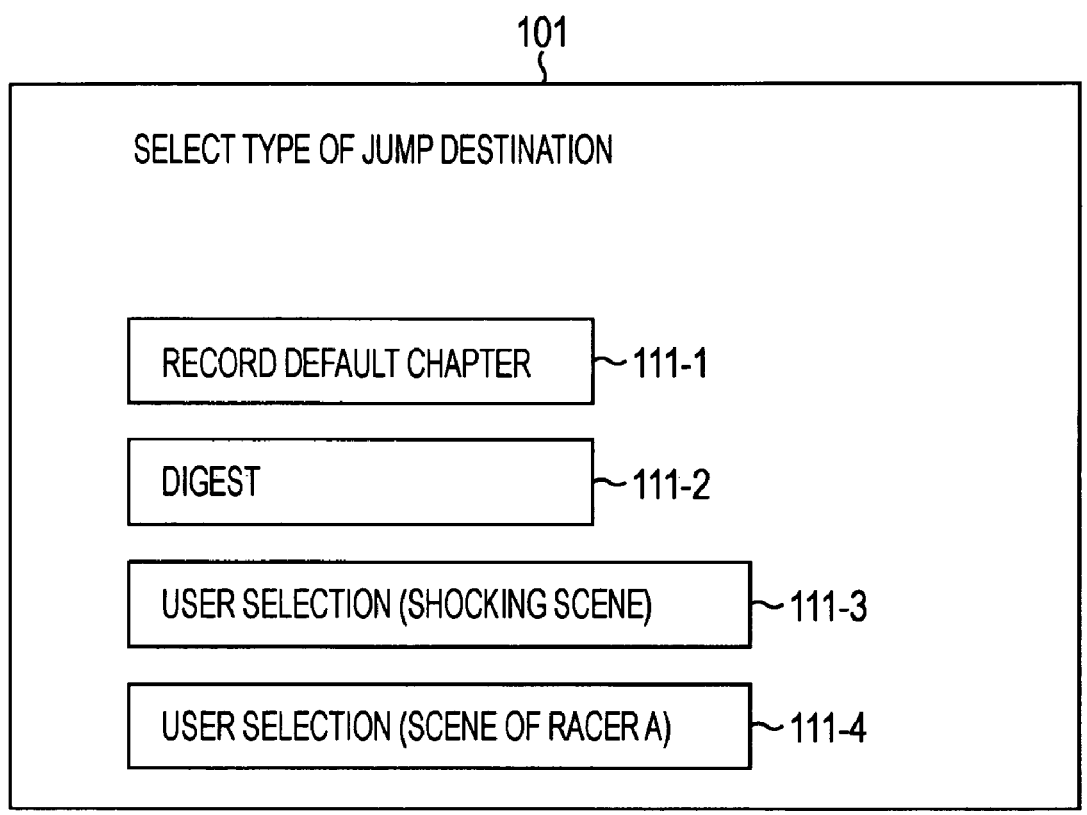
FIG. 17 is a view showing a display example of a content jump-destination information list.

FIG. 17 shows a display example of a content jump-destination information list 101.

Selection information "Record Default Chapter" 111-1 displayed in the content jump-destination list 101 is selection information of the content jump-destination information transmitted from the server 1 serving as, for example, a recording/playback apparatus including a HDD, and shows that the jump-destination information corresponds to a chapter automatically given by the server 1 during the recording.

Selection information "Digest" 111-2 is, for example, selection information of the content jump-destination information transmitted from the server 51-1 managed by the provider of the content, and shows that the jump-destination information corresponds to a chapter that the provider of the content set to provide a digest version of the content. Selection information "User Selection (Shocking Scene)" is, for example, selection information of the content jump-destination information transmitted from the server 51-2 managed by one viewer of the content, and shows that the jump-destination information corresponds to chapters set for scenes that the viewer thought were shocking scenes.

Selection information "User Selection (Scene of Racer A)" 111-4 is, for example, selection information of the content jump-destination information transmitted from the server 51-3 managed by another viewer of the content, and shows that the jump-destination information corresponds to chapters set for scenes of a performer (one racer A) preferred by the viewer.

Referring back to FIG. 15, in step S104, the user operates the operation unit, which is not shown, and the input unit 28 inputs information indicating that the predetermined selection information 111 in the content jump-destination information list 101 is selected (i.e., a type of jump-destination information is selected) and reports the input information to the control unit 29. In response, in step S105, the control unit 29 creates a buffering list, based on the jump-destination information that is contained in the content jump-destination information and that corresponds to the selection information 111 that is currently selected from the content jump-destination information stored in the jump-destination-information storage unit 23. Since the processing performed in this case is analogous to the buffering-list creation processing performed in step S3 shown in FIG. 4, the description thereof is omitted.

Next, in step S106, the control unit 29 of the terminal 3 issues a data-transmission request to the server 1, based on the buffering list generated in step S105. Since the processing performed in this case is analogous to the data-transmission request processing performed in step S4 shown in FIG. 4, the description thereof is omitted.

In step S107, the control unit 29 controls the switch unit 22 to cause the data, transmitted in response to the request issued in step S106 and received by the communication unit 21, to be stored in the buffer 24 indicated by the buffering list.

Next, in step S108, the control unit 29 determines whether or not a playback stop instruction is input from the input unit 28. When it is determined that a playback stop instruction is not input, the processing step returns to step S104 and the subsequent processing is executed in the same manner.

When it is determined in step S108 that a playback stop instruction is input, the buffering processing ends.

Buffering processing when multiple types of jump-destination information are supplied is performed as described above. Although a case in which the content is a broadcast program has been mainly described above by way of example, the present invention is also applicable to a case in which the content is a movie or private video recorded on a DVD.

In the pre-buffering in the embodiment described above, the buffering is started from the next chapter of a chapter that is currently being played back (in step S23 in FIG. 6). However, the arrangement may also be such that a chapter to be pre-buffered can be specified by the user.

Figure 18:
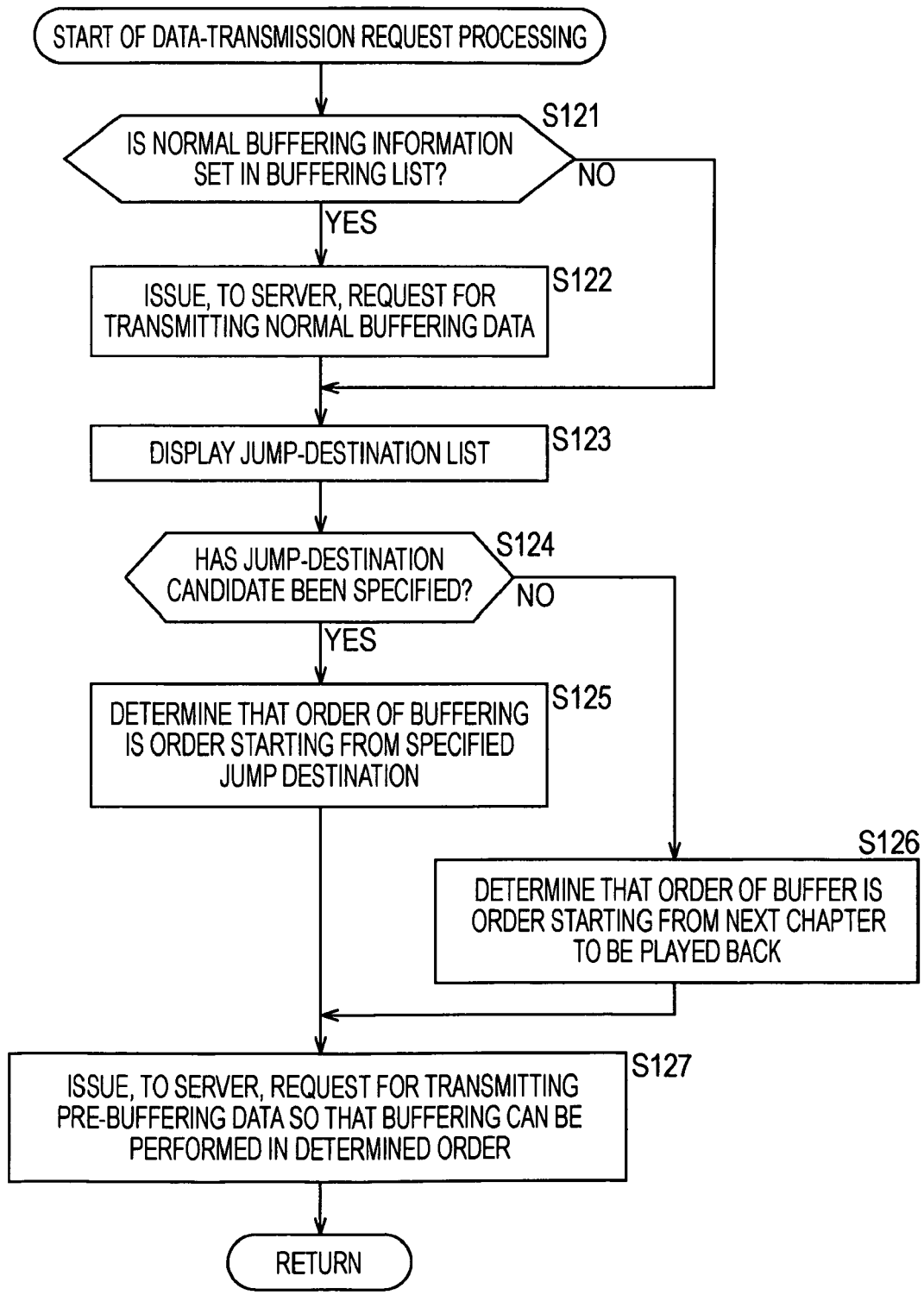
FIG. 18 is a flowchart illustrating other data-transmission request processing.

The data-transmission request processing in this case (step S4 in FIG. 4 or step S106 in FIG. 15) will be described with reference to the flowchart shown in FIG. 18.

Figure 15:
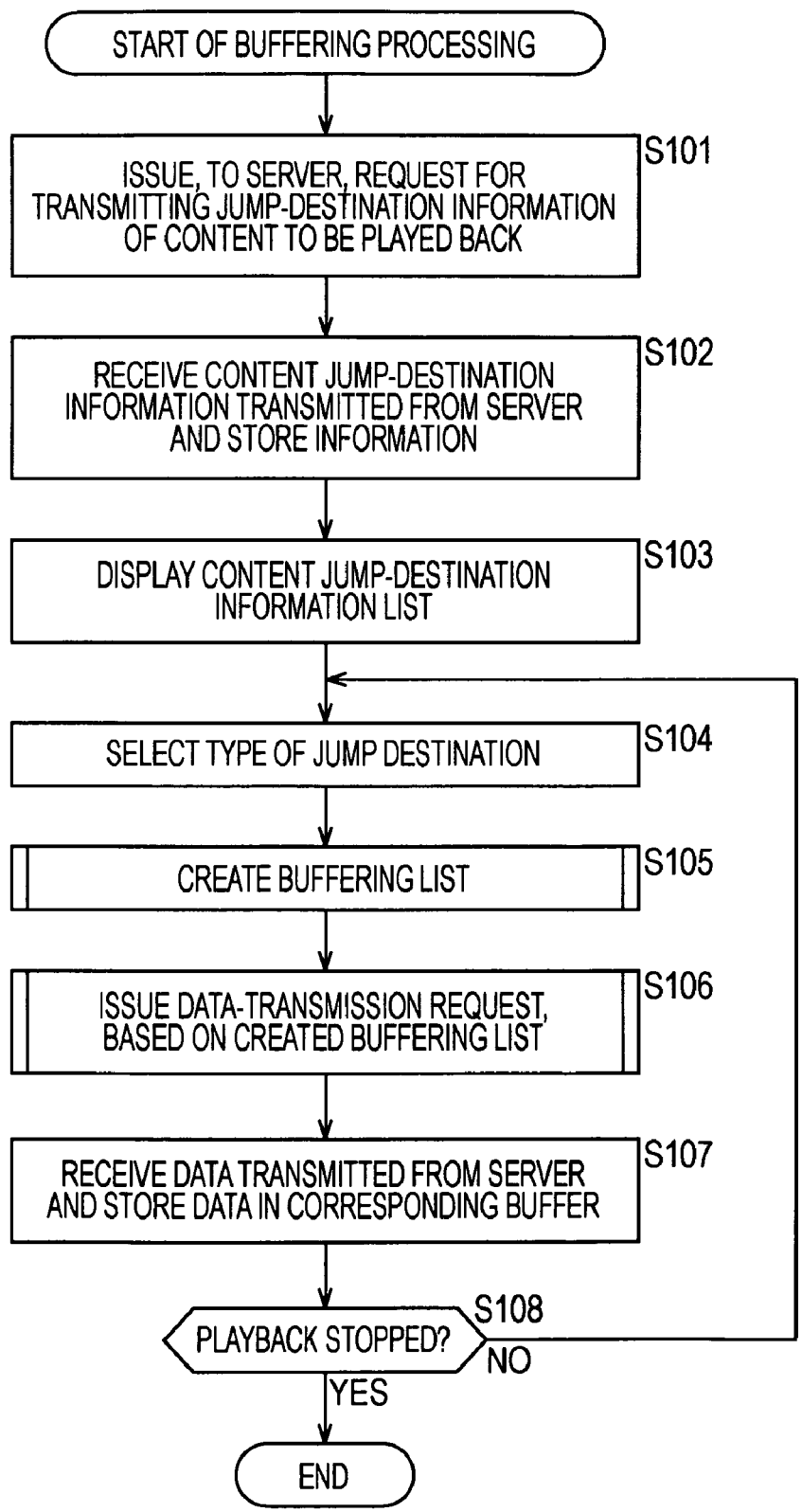
FIG. 15 is a flowchart illustrating other buffering processing of the terminal 3.

In step S121, the control unit 29 of the terminal 3 determines whether or not normal buffering information is set in the buffering list generated in step S3 shown in FIG. 4 or in step S105 shown in FIG. 15. When it is determined that normal buffering information is set, the process proceeds to step S122. The control unit 29 then issues, to the server 1, a request for transmitting the normal buffering data.

For example, the control unit 29 controls the communication unit 21 to transmit the normal-buffering-data identification information, read from the normal buffering information, to the server 1.

When it is determined in step S121 that normal buffering information is not set or when it is determined in step S122 that a request for transmitting normal buffering data is issued, the control unit 29 causes a list of jump-destination information (hereinafter referred to as a "jump-destination list") set in the buffering list to be displayed in step S123.

Figure 19:
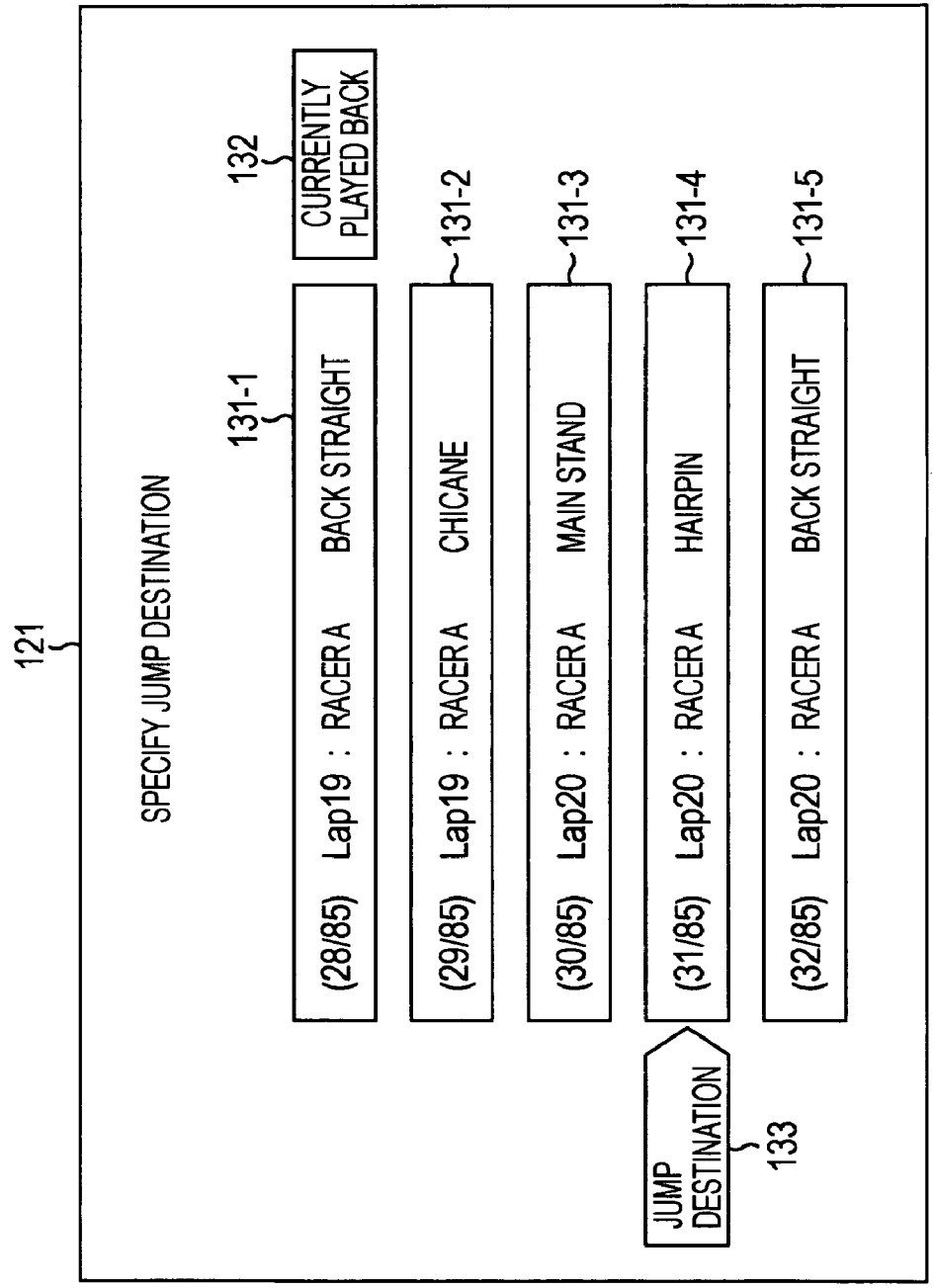
FIG. 19 is a view showing an example of a jump-destination list.

FIG. 19 shows a display example of a jump-destination list 121 when the selection information 111-4 shown in FIG. 17 is selected in step S104 shown in FIG. 15 and a buffering list is generated based on jump-destination information corresponding to the selected selection information 111-4.

In this example, description information (FIG. 16) of each chapter, the description information being contained in the jump-destination information, is displayed. Description information 131-1 describing a scene of a chapter that is being played back is displayed at the top together with a mark 132 indicating that the chapter is being played back, and description information 131-2 to 131-5 subsequent to that chapter is displayed in order of playback. Other description information can also be displayed by scrolling.

This jump-destination list 121 has a cursor 133 that can be moved by the user's operation on the operation unit. By using the cursor 133 to point to the predetermined description information 131 displayed in the jump-destination list 121 and performing a predetermined decision operation, the user can start jump playback from a chapter corresponding to the description information 131 (i.e., can specify a jump destination).

Referring back to FIG. 18, in step S124, the control unit 29 determines whether or not a jump-destination candidate has been specified.

For example, when the cursor 133 points to certain description information 131 displayed in the jump-destination list 121 for a predetermined time or more, it is determined that a chapter corresponding to the description information 131 pointed to by the cursor 133 has been specified as a jump-destination candidate.

When it is determined in step S124 that a jump-destination candidate has been specified, in step S125, the control unit 29 determines the order of buffering so that buffering can be performed, in order of playback, from the chapter specified as the jump-destination candidate.

When it is determined in step S124 that a jump-destination candidate has not been specified, the process proceeds to step S126. The control unit 29 then determines the order of buffering so that buffering can be performed, in order of playback, from the next chapter of a chapter that is currently being played back.

When the order of buffering is determined in step S125 or S126, in step S127, a request for transmitting pre-buffering data is issued to the server 1 so that the pre-buffering data is buffered in the determined order, as in the case in step S24 shown in FIG. 6.

When the request for the data transmission is issued to the server 1, as described above, the process proceeds to step S5 shown in FIG. 4 or step S107 shown in FIG. 15.

As described above, the user can specify a chapter for which pre-buffering is to be started.

In the example of the jump-destination list 121 shown in FIG. 19, the cursor 133 is moved to specify a jump destination. In this case, a chapter corresponding to the description information 131 pointed to by the cursor 133 for a predetermined time or more is paid attention to by the user, and is thus highly likely to be specified as a jump destination during a subsequent operation. Accordingly, the chapter of the description information 131 pointed to by the cursor 133 for a predetermined time or more may be buffered before the chapter is determined as a jump destination. This allows the pre-buffering to be efficiently performed.

Figure 20:
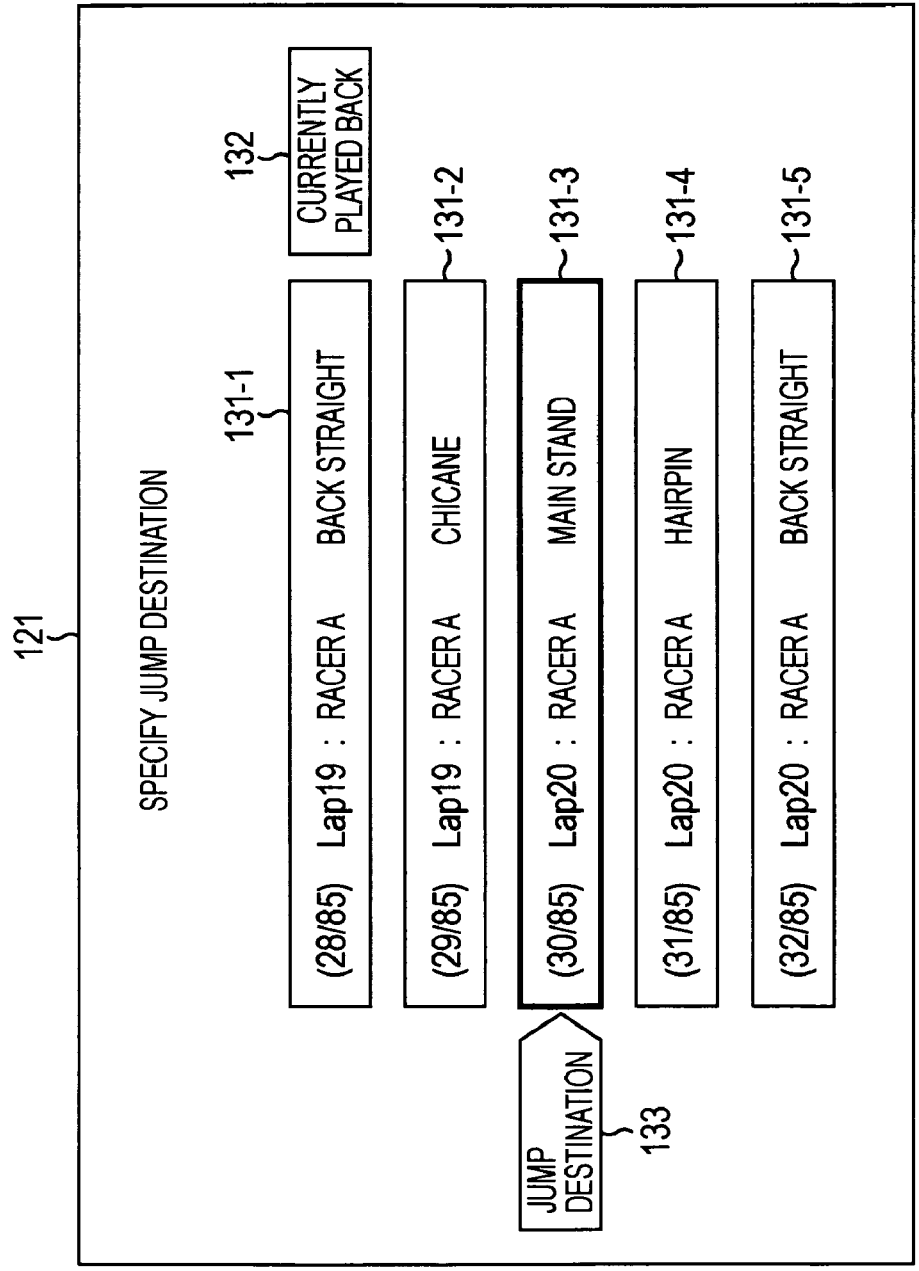
FIG. 20 is a view showing another display example of the jump-destination list.

In this respect, as shown in FIG. 20, description information 131-3 pointed to by the cursor 133 can also be displayed in a highlighted manner (be displayed surrounded by a frame, in the example of FIG. 20), compared to other description information 131-1, 131-2, 131-4, and 131-5. As a result, it is possible to give the user a strong impression of the description information 131-3 that is currently pointed to by the cursor 133, so that a chapter corresponding to the description information 131-3 is more likely to be specified as a jump destination. As a result, before the chapter corresponding to the description information 131-3 is determined as a jump destination (when the cursor 133 points to the description information 131-3 for a predetermined time or more), buffering for the chapter is performed. Thus, it is possible to more reliably perform the jump playback.

Figure 21:
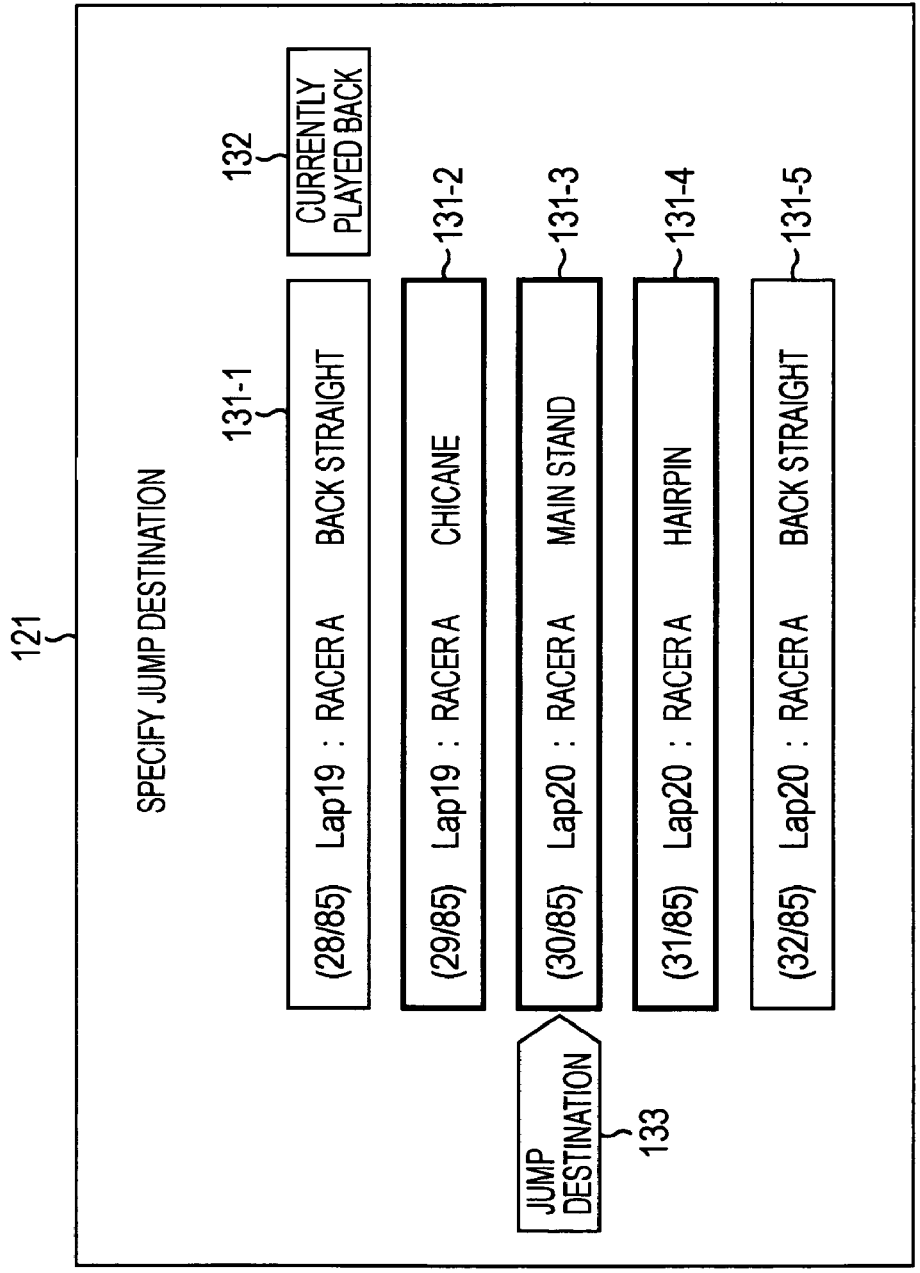
FIG. 21 is a view showing another display example of the jump-destination list.

As shown in FIG. 21, in addition to the description information 131-3 that is currently pointed to by the cursor 133, the description information 131-2 and 131-4 in the vicinity the description information 131-3 can also be displayed in a highlighted manner. In this case, the chapters corresponding to the description information 131-2 and 131-4, in addition to the chapter corresponding to the description information 131-3, are also regarded as jump-destination candidates and are buffered.

In FIGS. 20 and 21, the description information 131-3 that is currently pointed to by the cursor 133 or the description information 131-2 and 131-4 in the vicinity of the description information 131-3 is displayed in a highlighted manner compared to the other description information. Instead, the other description information 131 may also be displayed so as to be less distinct.

In the above processing, when the cursor 133 points to certain description information 131 displayed in the jump-destination list 121 for a predetermined time or more, the chapter corresponding to the description information 131 pointed to by the cursor 133 is specified as a jump destination candidate. However, a jump-destination candidate can be specified by another method, if it is possible to specify a chapter that is likely to be specified as a jump destination.

The reason why the case in which the description information 131 displayed in the jump-destination information 121 is pointed to for a certain time or more was described is to prevent each chapter corresponding to the description information 131 pointed to by the cursor 133 during scrolling of the jump-destination list 121 from being specified as a jump-destination candidate. Alternatively, the arrangement can also be such that any jump-destination candidate is not specified during scrolling.

Since the jump-destination lists 121 shown in FIGS. 19 to 21 are displayed during the processing in step S4 shown in FIG. 4 or in S106 shown in FIG. 15, there is a possibility that the playback has been started at the point (e.g., in step S11 in FIG. 5 which indicates details of the processing in step S3 in FIG. 4).

FIGS. 22 to 25 show display examples of the jump-destination list 121 when the playback of content is started and the video thereof is displayed.

Figure 22:
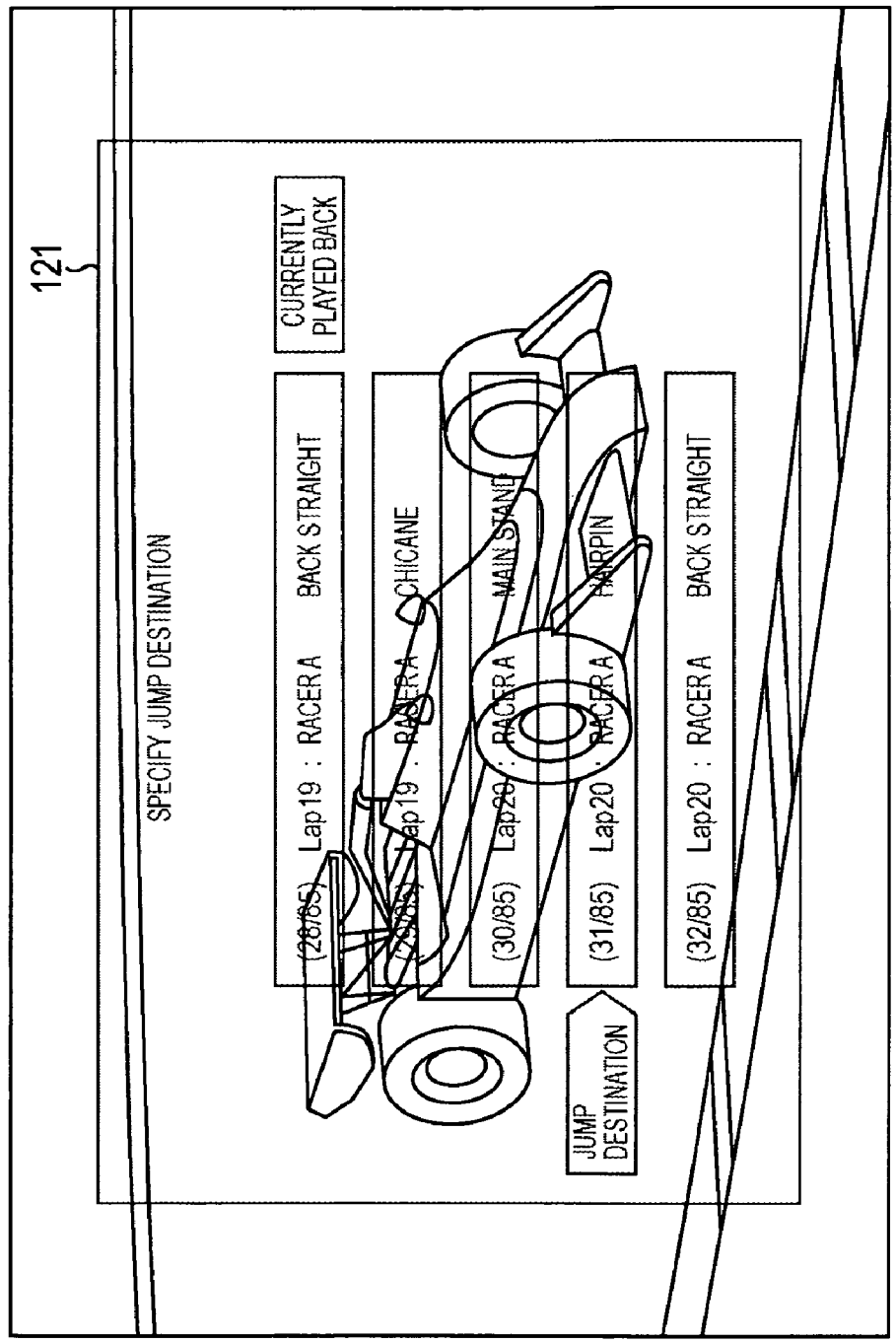
FIG. 22 is a view showing another display example of the jump-destination list.

In the example shown in FIG. 22, a translucent image of the jump destination list 121 is displayed superimposed on the video of the content (i.e., is alpha blended).

Figure 23:
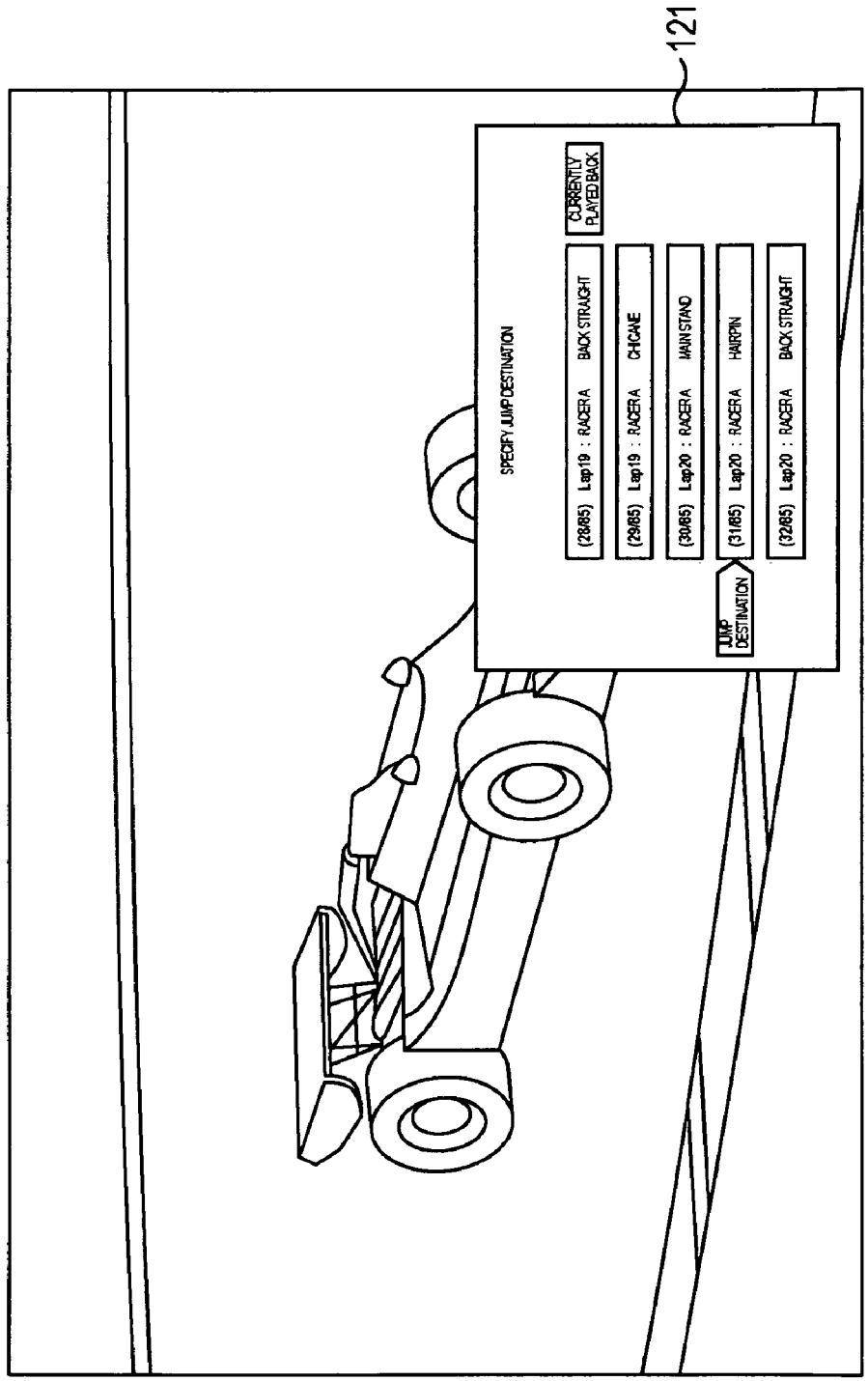
FIG. 23 is a view showing another display example of the jump-destination list.
Figure 24:
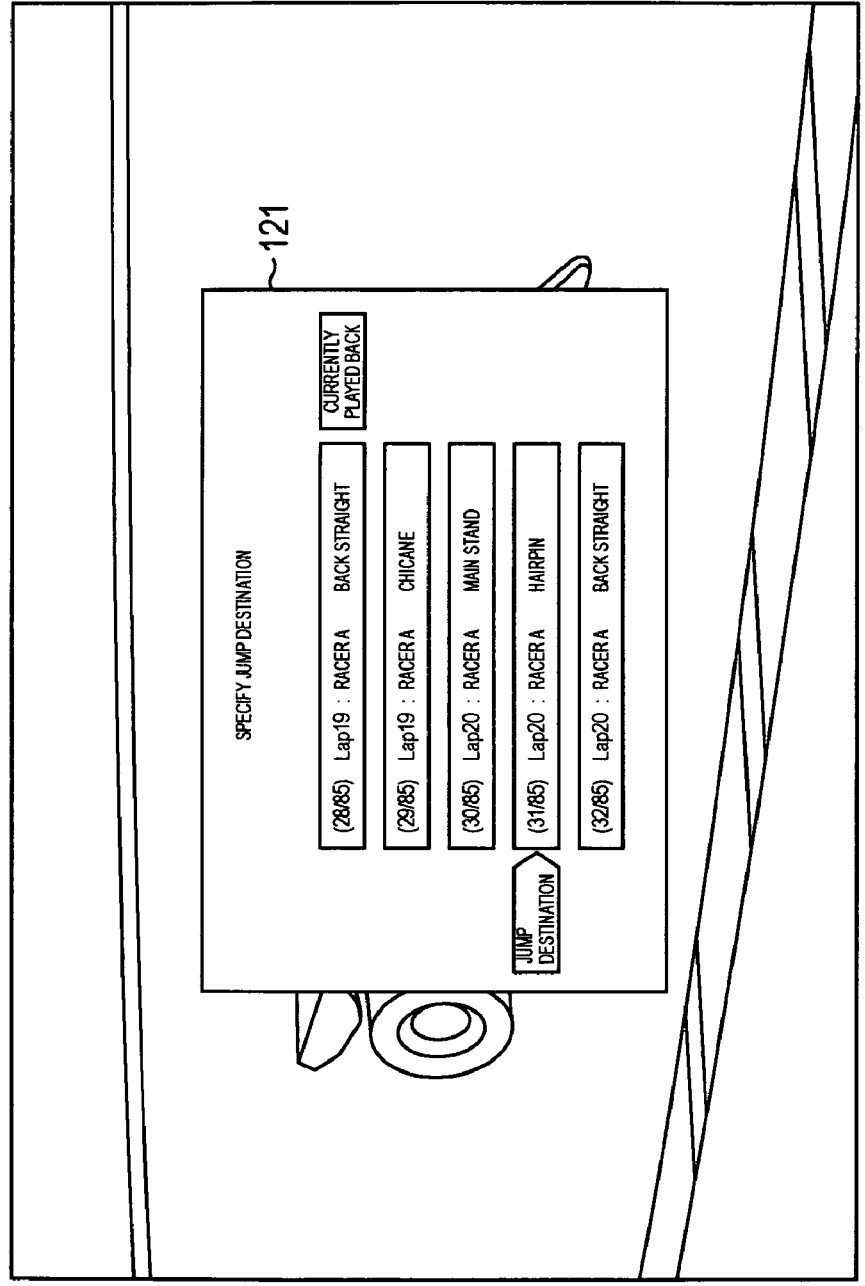
FIG. 24 is a view showing another display example of the jump-destination list.

In the examples shown in FIGS. 23 and 24, the jump-destination list 121 is reduced in size and is displayed at the lower right or the center of the video of the content.

Figure 25:
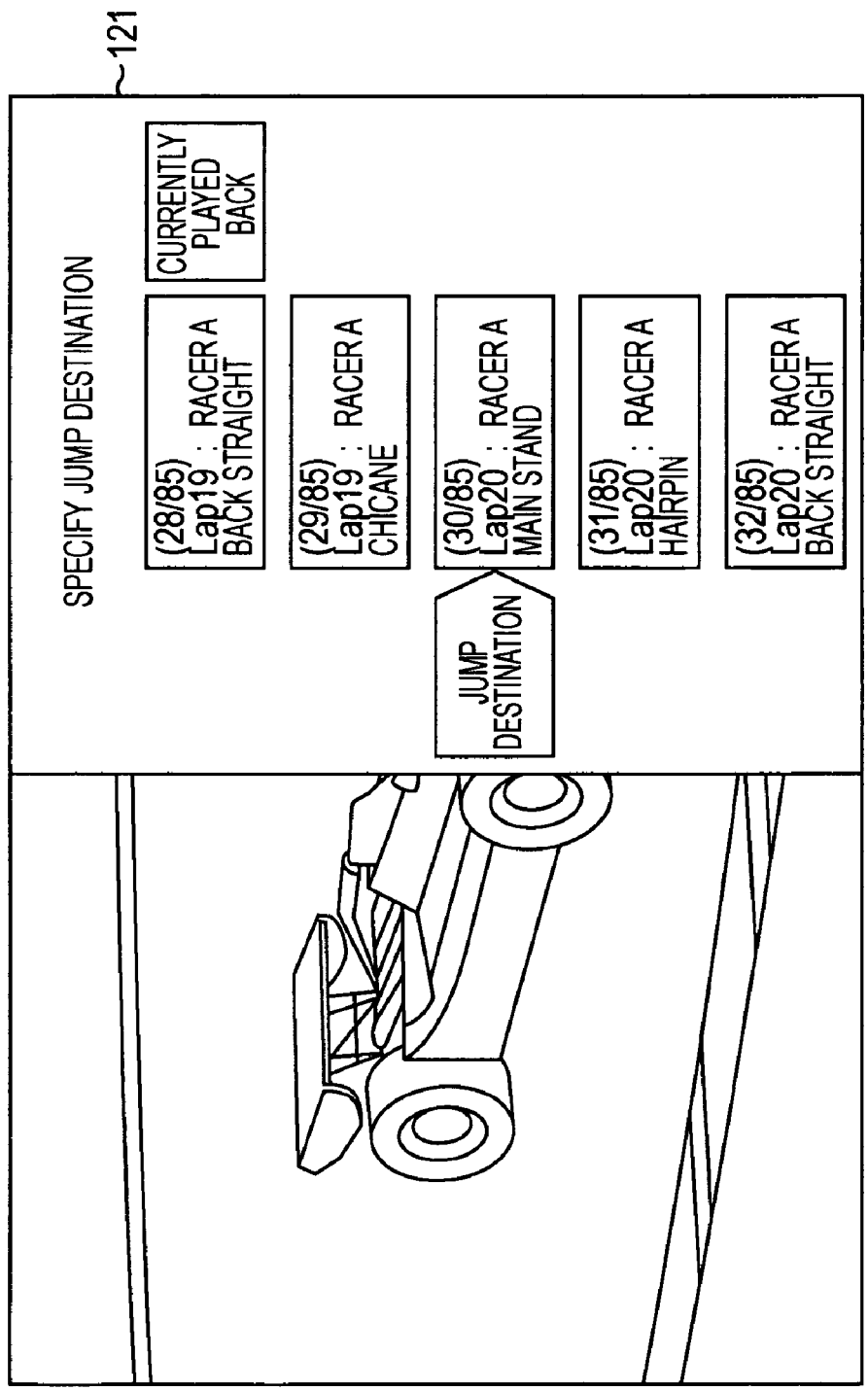
FIG. 25 is a view showing another display example of the jump-destination list.

In the example shown in FIG. 25, the jump-destination list 121 is configured to be vertically oblong and is displayed at the right end of the video of the content.

The above-described series of processing can be performed by hardware or software. When the series of processing is performed by software, a program that implements the software is installed on a general-purpose computer or the like.

Figure 26:
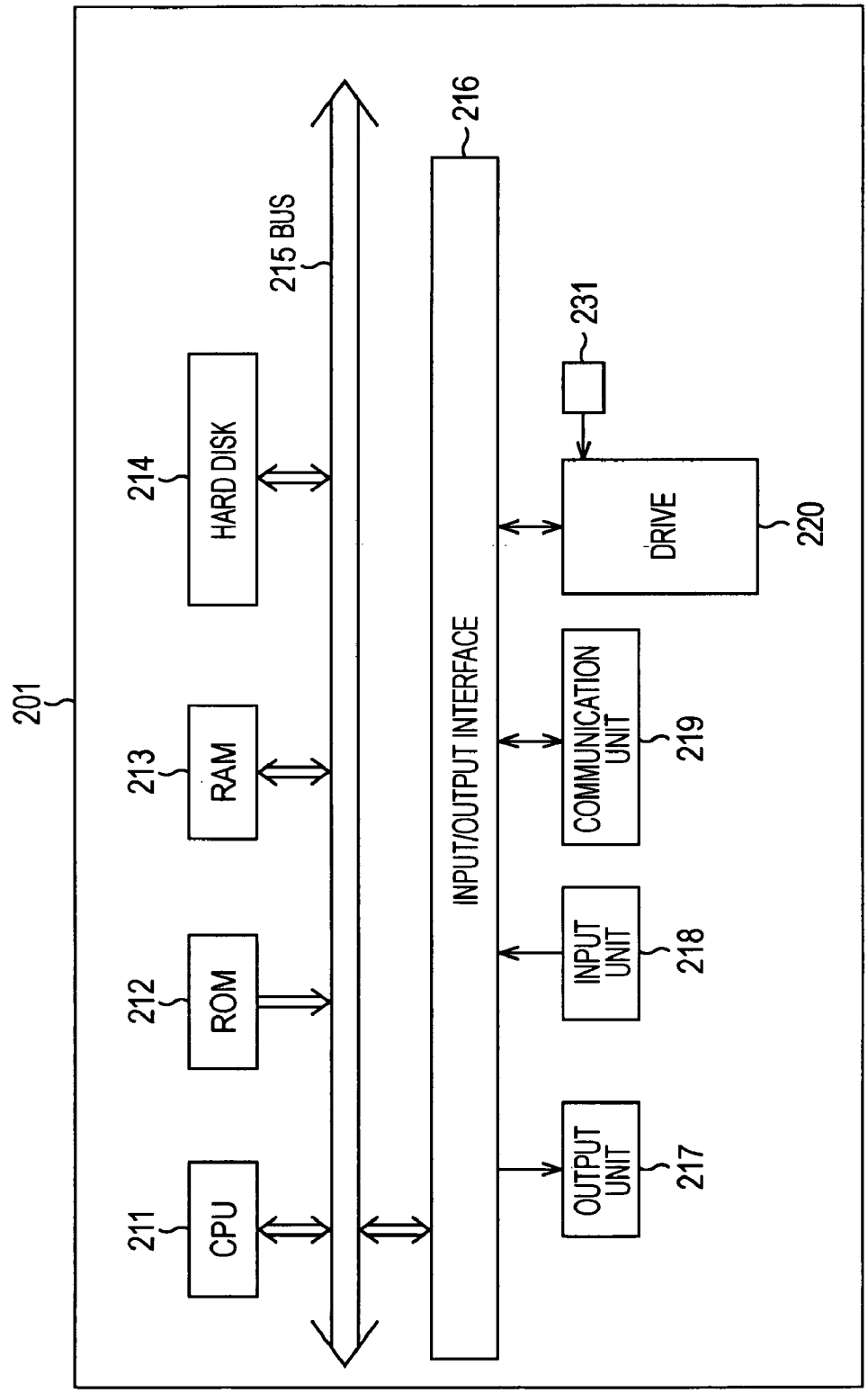
FIG. 26 is a diagram showing a configuration example of a personal computer.

FIG. 26 shows a configuration example of an embodiment of a computer on which the program for executing the above-described series of processing is installed.

The program can be pre-recorded on a hard disk 214 or a ROM 212, which serves as a storage medium built into the computer.

Alternatively, the program can be temporarily or permanently stored (recorded) on a removable storage medium 231, such as a flexible disc, a CD-ROM (compact disc read only memory), an MO (magneto optical) disc, a DVD (digital versatile disc), a magnetic disk, or a semiconductor memory. Such a removable storage medium 231 can be supplied as the so-called "packaged software".

In addition to installing the program on the computer via a removable storage medium 231 as described above, the arrangement can also be such that the program is wirelessly transferred from a download site via a satellite for digital satellite broadcast or is transferred to the computer through a wired network, such as a LAN (local area network) or the Internet, and the computer uses a communication unit 219 to receive the program transferred in such a manner and installs the program on the built-in hard disk 214.

The computer has a CPU (central processing unit) 211 therein. An input/output interface 216 is connected to the CPU 211 via a bus 215. For example, when the user operates an input unit 218, which includes a keyboard, a mouse, a microphone, and so on, to input an instruction via the input/output interface 216, the CPU 211 executes the program stored in the ROM (read only memory) 212 in accordance with the instruction. Alternatively, the CPU 211 loads, into the RAM (random access memory) 213, the program stored on the hard disk 214; the program transferred from a satellite or a network, received by the communication unit 219, and installed on the hard disk 214; or the program read from the removable storage medium 231 loaded into a drive 220 and installed on the hard disk 214. The CPU 211 then executes the loaded program. With this arrangement, the CPU 211 performs processing implemented by the above-described configurations shown in the block diagrams. As needed, for example, the CPU 211 causes the result of the processing to be output from an output unit 217 or to be transmitted from the communication unit 219 via the input/output interface 216 and further causes the result to be recorded on the hard disk 214. The output unit 217 includes an LCD (liquid crystal display), a speaker, and so on.

In this case, the program may be processed by one computer or may be processed in a distributed manner by multiple computers. In addition, the program may be transferred to a remote computer for execution.

The embodiments of the present invention are not limited to the above-described embodiments, and various changes can be made thereto without departing from the spirit of the present invention.

The invention claimed is:

1. A playback apparatus that performs real-time playback of content transmitted through a network and that is capable of performing jump playback from a specified position, the playback apparatus comprising:
    buffering means for receiving, through the network, data of content to be played back from now and buffering the received data in a first buffer of a plurality of data buffers;
    playback means for playing back the data buffered by the buffering means stored in the first buffer; and
    specifying means for specifying a jump destination for jump playback,
    wherein the buffering means further receives, through the network, data of a jump destination or jump destinations that can be specified by the specifying means and buffers the received data in a second buffer of the plurality of data buffers, wherein the buffering of the data of a jump destination is performed in parallel with buffering of the data stored in the first buffer and at a lower speed than the buffering of the data stored in the first buffer, and
    when the specifying means specifies the jump destination and the buffering means buffers the data of the jump destination, the playback means performs jump playback from the buffered data.

2. The playback apparatus according to claim 1, further comprising obtaining means for obtaining, from a server that provides the content, information of the jump destination or jump destinations that can be specified by the specifying means, and
    based on the jump-destination information obtained by the obtaining means, the buffering means receives, through the network, the data of the jump destination or jump destinations that can be specified by the specifying means and buffers the received data.

3. The playback apparatus according to claim 1, wherein, when multiple jump destinations that can be specified by the specifying means exist, the buffering means receives, through the network in a predetermined order, the data of the jump destinations that can be specified by the specifying means and buffers the received data.

4. The playback apparatus according to claim 1, wherein, when multiple jump destinations that can be specified by the specifying means exist, the buffering means receives, through the network, only the data of a predetermined one of the jump destinations that can be specified by the specifying means and buffers the received data.

5. The playback apparatus according to claim 1, wherein, when a request for jump playback is issued, the buffering means performs reception, through the network, with respect to only a jump destination corresponding to a position of the jump destination of the requested jump playback out of the jump destinations that can be specified by the specifying means, and performs buffering.

6. The playback apparatus according to claim 1, further comprising:
    obtaining means for obtaining multiple types of jump-destination information for the content to be played back;
    presenting means for presenting selection information of the multiple types of jump-destination information obtained by the obtaining means; and
    selecting means for selecting predetermined selection information from the selection information presented by the presenting means,
    wherein, based on the jump-destination information corresponding to the selection information selected by the selecting means, the buffering means receives, through the network, the data of the jump-destinations that can be specified by the specifying means and buffers the received data.

7. The playback apparatus according to claim 1, wherein the specifying means comprises:
    displaying means for displaying a list of the jump destinations; and
    jump-destination specifying means for specifying a predetermined jump destination of the jump-destination list displayed by the displaying means;
    wherein the buffering means receives, through the network, the data of the jump destinations that can be specified by the specifying means and buffers the received data, in a predetermined order from the jump destination specified by the jump-destination specifying means.

8. The playback apparatus according to claim 7, wherein the jump-destination specifying means comprises:
- candidate specifying means for specifying a jump-destination candidate out of the jump destinations displayed in the jump-destination list; and
- jump-destination deciding means for deciding the jump-destination candidate as a jump destination,
- wherein the buffering means receives, through the network, the data of the jump destinations that can be specified by the specifying means and buffers the received data, in a predetermined order from the jump destination specified as the jump-destination candidate when the candidate specifying means specifies the jump-destination candidate.

9. The playback apparatus according to claim 8, wherein the displaying means controls the display of the jump-destination list so that display of the jump destination specified by the candidate specifying means or a vicinity of the specified jump destination is highlighted compared to display of other jump destinations.

10. A playback method for a playback apparatus that performs real-time playback of content transmitted through a network and that is capable of performing jump playback from a specified position, the playback method comprising:
- a buffering step of receiving, through the network, data of content to be played back from now and buffering the received data in a first buffer of a plurality of data buffers;
- a playback step of playing back the data buffered in the processing of the buffering step stored in the first buffer; and
- a specifying step of specifying a jump destination for jump playback,
- wherein in the buffering step, data of a jump destination or jump destinations that can be specified in the processing of the specifying step is further received through the network and is buffered in a second buffer of the plurality of data buffers, wherein the buffering of the data of a jump destination is performed in parallel with buffering of the data stored in the first buffer and at a lower speed than the buffering of the data stored in the first buffer, and
- when the jump destination is specified in the processing of the specifying step and the data of the jump destination is buffered in the processing of the buffering step, jump playback from the buffered data is performed in the playback step.

11. A non-transitory computer readable medium comprising instructions that, when executed by a processor, cause the processor to execute playback processing for performing real-time playback of content transmitted through a network and performing jump playback from a specified position, the instructions comprising:
- buffering, through the network, data of content to be played back from now and buffering the received data in a first buffer of a plurality of data buffers;
- playing back the data buffered in the processing of the buffering step stored in the first buffer; and
- specifying a jump destination for jump playback,
- wherein in the buffering step, data of a jump destination or jump destinations that can be specified in the processing of the specifying step is further received through the network and is buffered in a second buffer of the plurality of data buffers, wherein the buffering of the data of a jump destination is performed in parallel with buffering of the data stored in the first buffer and at a lower speed than the buffering of the data stored in the first buffer, and
- when the jump destination is specified in the processing of the specifying step and the data of the jump destination is buffered in the processing of the buffering step, jump playback from the buffered data is performed in the playback step.

* * * * *